US012644308B2

(12) United States Patent
Holmes et al.

(10) Patent No.: US 12,644,308 B2
(45) **Date of Patent: *Jun. 2, 2026**

(54) LOCK CYLINDER WITH ELECTRONIC KEY RECOGNITION

(71) Applicant: Schlage Lock Company LLC, Carmel, IN (US)

(72) Inventors: Douglas A. Holmes, Golden, CO (US); Aaron P. McKibben, Fishers, IN (US); Sundar R. D. Vasudevan, Bangalore (IN); Anoop Dutt Mysore Nagesh, Bangalore (IN)

(73) Assignee: Schlage Lock Company LLC, Carmel, IN (US)

(*) Notice: Subject to any disclaimer, the term of this patent is extended or adjusted under 35 U.S.C. 154(b) by 67 days.

This patent is subject to a terminal disclaimer.

(21) Appl. No.: 18/903,613

(22) Filed: Oct. 1, 2024

(65) Prior Publication Data

US 2025/0137290 A1 May 1, 2025

Related U.S. Application Data

(60) Continuation of application No. 17/511,144, filed on Oct. 26, 2021, now Pat. No. 12,104,403, which is a continuation of application No. 16/573,648, filed on Sep. 17, 2019, now Pat. No. 11,156,019, which is a division of application No. 15/081,609, filed on Apr. 14, 2016, now Pat. No. 10,415,269.

(51) Int. Cl.

| | |
|---|---|
| ***E05B 27/00*** | (2006.01) |
| ***E05B 47/06*** | (2006.01) |
| *E05B 47/00* | (2006.01) |

(52) U.S. Cl.
CPC ...... *E05B 27/0042* (2013.01); *E05B 27/0017* (2013.01); *E05B 27/0071* (2013.01); *E05B 27/0082* (2013.01); *E05B 47/063* (2013.01); *E05B 2047/0067* (2013.01)

(58) Field of Classification Search
CPC .. E05B 27/00; E05B 27/0042; E05B 27/0017; E05B 27/0071; E05B 27/0082; E05B 47/063; E05B 2047/0067; Y10T 70/7915; Y10T 70/7667
USPC .......................................................... 70/416
See application file for complete search history.

(56) References Cited

U.S. PATENT DOCUMENTS 2,623,959 A 12/1952 Jarrett
3,733,862 A 5/1973 Killmeyer
4,390,758 A 6/1983 Hendrickson
(Continued)

*Primary Examiner* — Suzanne L Barrett
(74) *Attorney, Agent, or Firm* — Taft Stettinius & Hollister LLP

(57) ABSTRACT

A lock cylinder including a plug, a plurality of key followers, a sensor assembly structured to sense positions of the key followers, and a controller in communication with the sensor assembly. The plug includes a keyway and a plurality of plug tumbler shafts. Each of the key followers is movably seated in a corresponding one of the plug tumbler shafts and includes a sensor interface. The sensor assembly includes a plurality of sensors, each of which includes at least one sensing region. Each of the key followers is associated with one of the sensors via an associative link formed between the sensor interface and the corresponding sensing region. The sensors are structured to generate an output signal indicative of the transverse position of the associated key follower, and the controller is structured to select and perform actions based upon the output signals.

20 Claims, 17 Drawing Sheets

(56) References Cited

U.S. PATENT DOCUMENTS

| | | | |
|---|---|---|---|
| 4,656,851 | A | 4/1987 | Leek et al. |
| 4,721,956 | A | 1/1988 | Demster |
| 4,982,587 | A | 1/1991 | Tzou |
| 5,309,152 | A | 5/1994 | Krucoff |
| 5,543,665 | A | 8/1996 | Demarco |
| 5,628,217 | A | 5/1997 | Herrera |
| 5,677,682 | A | 10/1997 | Thorsen et al. |
| 5,691,711 | A | 11/1997 | Jorgensen |
| 6,000,609 | A | 12/1999 | Gokcebay et al. |
| 6,318,137 | B1 | 11/2001 | Chaum |
| 7,140,214 | B2 | 11/2006 | Lindstrom |
| 7,690,231 | B1 | 4/2010 | Field et al. |
| 7,874,190 | B2 | 1/2011 | Krisch et al. |
| 7,941,934 | B2 | 5/2011 | Gerner et al. |
| 7,958,647 | B2 | 6/2011 | Gerner |
| 8,314,681 | B2 | 11/2012 | Bell |
| 8,899,082 | B2 | 12/2014 | Keller |
| 9,394,723 | B1 | 7/2016 | Roth et al. |
| 9,567,770 | B1 | 2/2017 | Ginos et al. |
| 10,030,416 | B1 | 7/2018 | Albertson et al. |
| 10,066,419 | B2 | 9/2018 | van Buynder |
| 10,400,475 | B2 | 9/2019 | Klammer et al. |
| 10,415,269 | B2 | 9/2019 | Holmes et al. |
| 11,156,019 | B2 | 10/2021 | Holmes et al. |
| 2010/0077809 | A1 | 4/2010 | Gerner et al. |
| 2010/0170312 | A1 | 7/2010 | Field et al. |
| 2016/0017636 | A1 | 1/2016 | Charnley et al. |
| 2017/0152677 | A1 | 6/2017 | Klammer et al. |

LOCK CYLINDER WITH ELECTRONIC KEY RECOGNITION

CROSS REFERENCE TO RELATED APPLICATIONS

The present application is a continuation of U.S. patent application Ser. No. 17/511,144 filed Oct. 26, 2021 and issued as U.S. Pat. No. 12,104,403, which is a continuation of U.S. patent application Ser. No. 16/573,648 filed Sep. 17, 2019 and issued as U.S. Pat. No. 11,156,019, which is a divisional of U.S. patent application Ser. No. 15/081,609 filed Apr. 14, 2016 and issued as U.S. Pat. No. 10,415,269, the contents of each application are incorporated herein by reference in their entirety.

TECHNICAL FIELD

The present disclosure generally relates to recognition of mechanical keys, and more particularly but not exclusively relates to electronic recognition of mechanical key codes.

BACKGROUND

Certain lock devices include mechanisms for electronically sensing the bitting profile of a mechanical key. Some such systems have certain limitations, such as being susceptible to wear, tampering events, and/or improper authentication of unauthorized keys. Therefore, a need remains for further improvements in this technological field.

SUMMARY

An exemplary lock cylinder including a plug, a plurality of key followers, a sensor assembly structured to sense positions of the key followers, and a controller in communication with the sensor assembly. The plug includes a keyway and a plurality of plug tumbler shafts. Each of the key followers is movably seated in a corresponding one of the plug tumbler shafts and includes a sensor interface. The sensor assembly includes a plurality of sensors, each of which includes at least one sensing region. Each of the key followers is associated with one of the sensors via an associative link formed between the sensor interface and the corresponding sensing region. The sensors are structured to generate an output signal indicative of the transverse position of the associated key follower, and the controller is structured to select and perform actions based upon the output signals. Further embodiments, forms, features, and aspects of the present application shall become apparent from the description and figures provided herewith.

DETAILED DESCRIPTION OF ILLUSTRATIVE EMBODIMENTS

Figure 1:
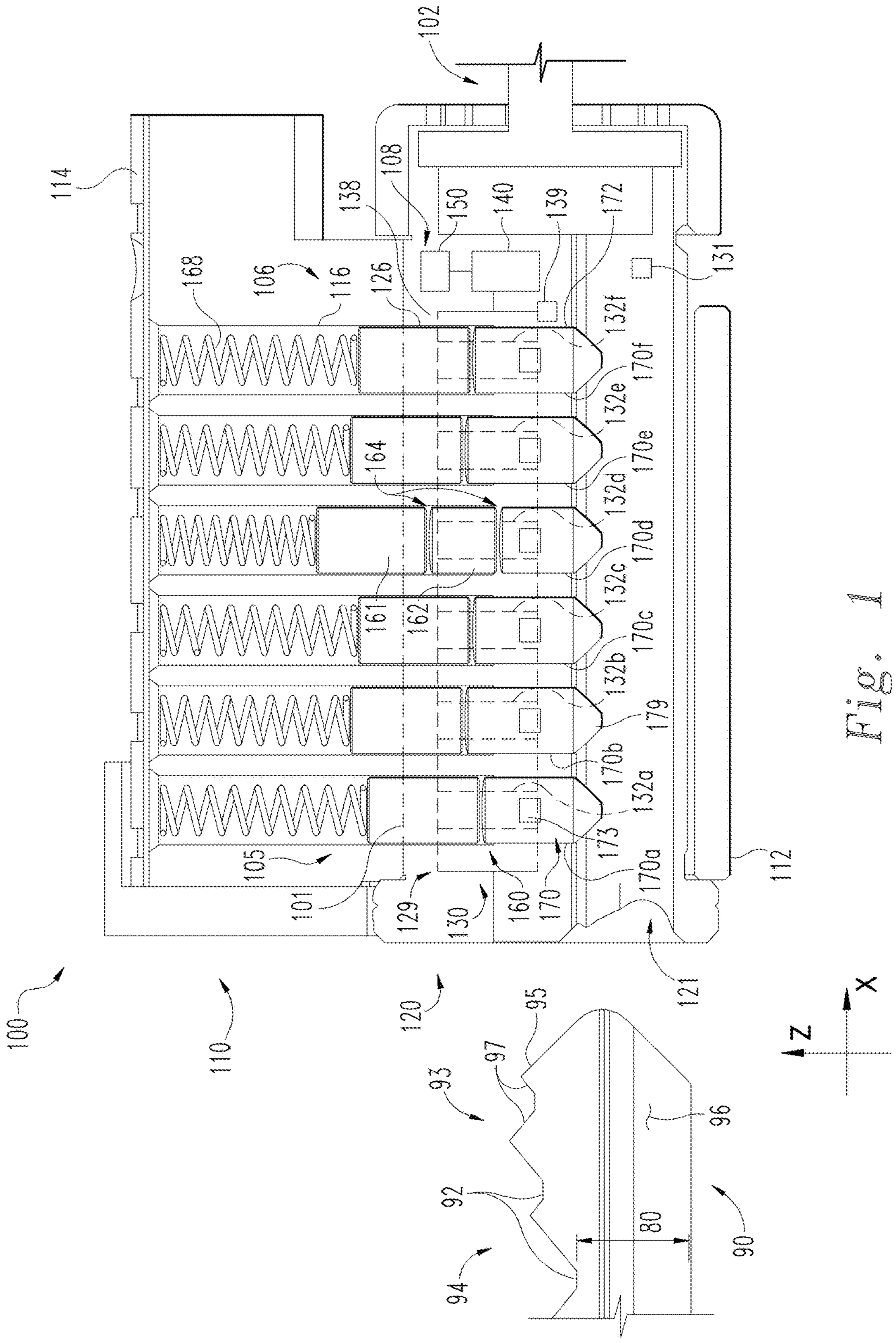
FIG. 1 is a cross-sectional illustration of a key and a lock cylinder according to one embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 3A:
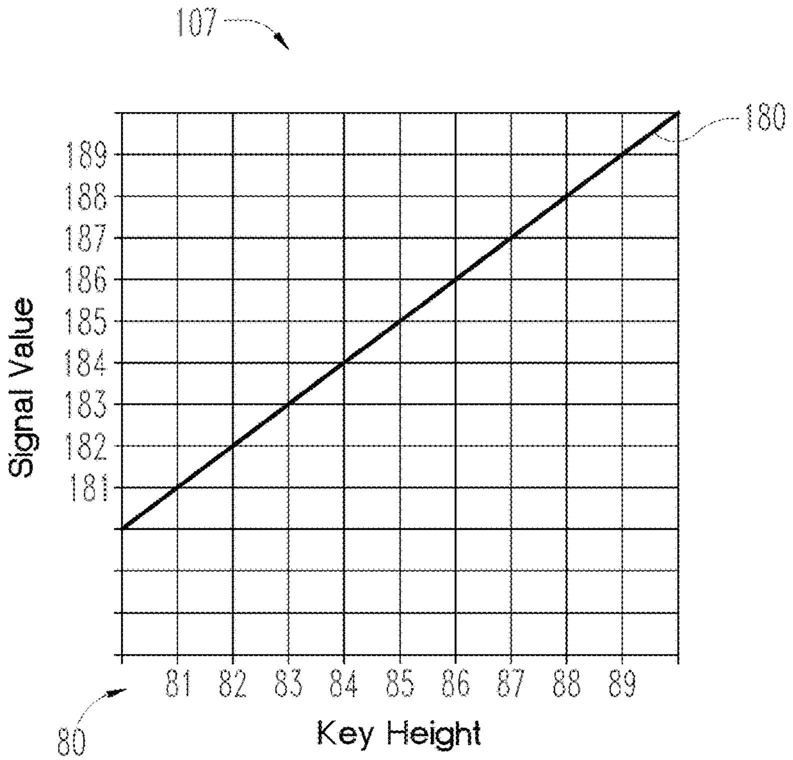
FIG. 3*a* is a graph which illustrates a correlation between an output signal and a key height.

As used herein, the terms "longitudinal," "lateral," and "transverse" are used to denote motion or spacing along three mutually perpendicular axes, wherein each of the axes defines two opposite directions. In the coordinate system illustrated in FIGS. 3 and 4, the X-axis defines first and second longitudinal directions, the Y-axis defines first and second lateral directions, and the Z-axis defines first and second transverse directions. The directions defined by each axis may be referred to as positive and negative directions, wherein the arrow of the axis indicates the positive direction.

Additionally, the descriptions that follow may refer to the directions defined by the axes with specific reference to the orientations illustrated in the Figures. For example, the longitudinal directions may be referred to as "distal" ($X^+$) and "proximal" ($X^-$), the lateral directions may be referred to as "left" ($Y^+$) and "right" ($Y^-$), and the transverse directions may be referred to as "up" ($Z^+$) and "down" ($Z^-$). These terms are used for case and convenience of description, and are without regard to the orientation of the system with respect to the environment. For example, descriptions that reference a longitudinal direction may be equally applicable to a vertical direction, a horizontal direction, or an off-axis orientation with respect to the environment.

Furthermore, motion or spacing along a direction defined by one of the axes need not preclude motion or spacing along a direction defined by another of the axes. For example, elements which are described as being "laterally offset" from one another may also be offset in the longitudinal and/or transverse directions, or may be aligned in the longitudinal and/or transverse directions. The terms are therefore not to be construed as limiting the scope of the subject matter described herein.

FIG. 1 is a schematic illustration of a lock cylinder 100 according to one embodiment. The lock cylinder 100 is configured for use with a key 90, and generally includes a shell 110, a plug 120 rotatably mounted in the shell 110, a sensor assembly 130 mounted in the plug 120, a controller 140 in communication with the sensor assembly 130, and a plurality of tumbler sets 160 movably seated in the lock cylinder 100. Each of the tumbler sets 160 includes a driven pin or key follower 170 which rides along the top edge of the key 90 as the key 90 is inserted into the plug 120. The lock cylinder 100 may further include a tailpiece 102 extending from a distal end of the plug 120 and/or an electronic locking mechanism 150 in communication with the controller 140.

Additionally, the lock cylinder 100 includes a locking assembly 108 operable to selectively permit the plug 120 to rotate the tailpiece 102. In the illustrated form, the locking assembly 108 includes a mechanical locking mechanism 105 in the form of the tumbler sets 160, and an electronic locking mechanism 150. Each of the locking mechanisms 105, 150 is operable to selectively prevent the plug 120 from rotating the tailpiece 102. The plug 120 is operable to rotate the tailpiece 102 when each of the locking mechanisms 105, 150 is in an unlocking state, thereby defining an unlocked state of the cylinder 100. Conversely, the plug 120 is not operable to rotate the tailpiece 102 when either of the locking mechanisms 105, 150 is in a locking state, thereby defining a locked state of the cylinder 100. While the illustrated locking assembly 108 provides both mechanical and electronic locking functions, also contemplated that the locking assembly 108 may provide only one of the mechanical and electronic locking functions. Additionally, the sensor assembly 130, the controller 140 and key followers 170 are used to read or recognize the bitting code of the key 90, and may therefore be considered to form a key recognition assembly 109.

The key 90 includes a plurality of bittings 92, which collectively define an edge cut or bitting profile 94 formed in a narrow edge 95 of the key 90. The transverse (Z) positions of the bittings 92 define a bitting code 93, and the edge cut bitting profile 94 corresponds to the bitting code 93. As a result of the edge cut 94, the key 90 has a variable root depth or key height 80. The key height 80 at each of the bittings 92 may also be referred to as a bitting height 80, and the bitting profile 93 is defined by the bitting heights 80.

The shell 110 includes a longitudinally extending body portion 112, and may further include a tower 114 extending laterally from the body portion. The plug 120 is rotatably mounted in the body portion 112, and a shear line 101 is defined between an inner surface of the shell 110 and an outer surface of the plug 120. The shell 110 may further include a plurality of shell tumbler shafts 116, each configured to receive a portion of one of the tumbler sets 160.

The plug 120 includes a keyway 121 which is sized and configured to receive the key 90. The plug 120 also includes a plurality of plug tumbler shafts 126, each of which is configured to receive a portion of one of the tumbler sets 160. The plug 120 may also include a longitudinal channel 129 configured to receive at least a portion of the sensor assembly 130. As described in further detail below, each of the plug tumbler shafts 126 may include one or more lateral channels connected to the longitudinal channel 129.

Figure 2:
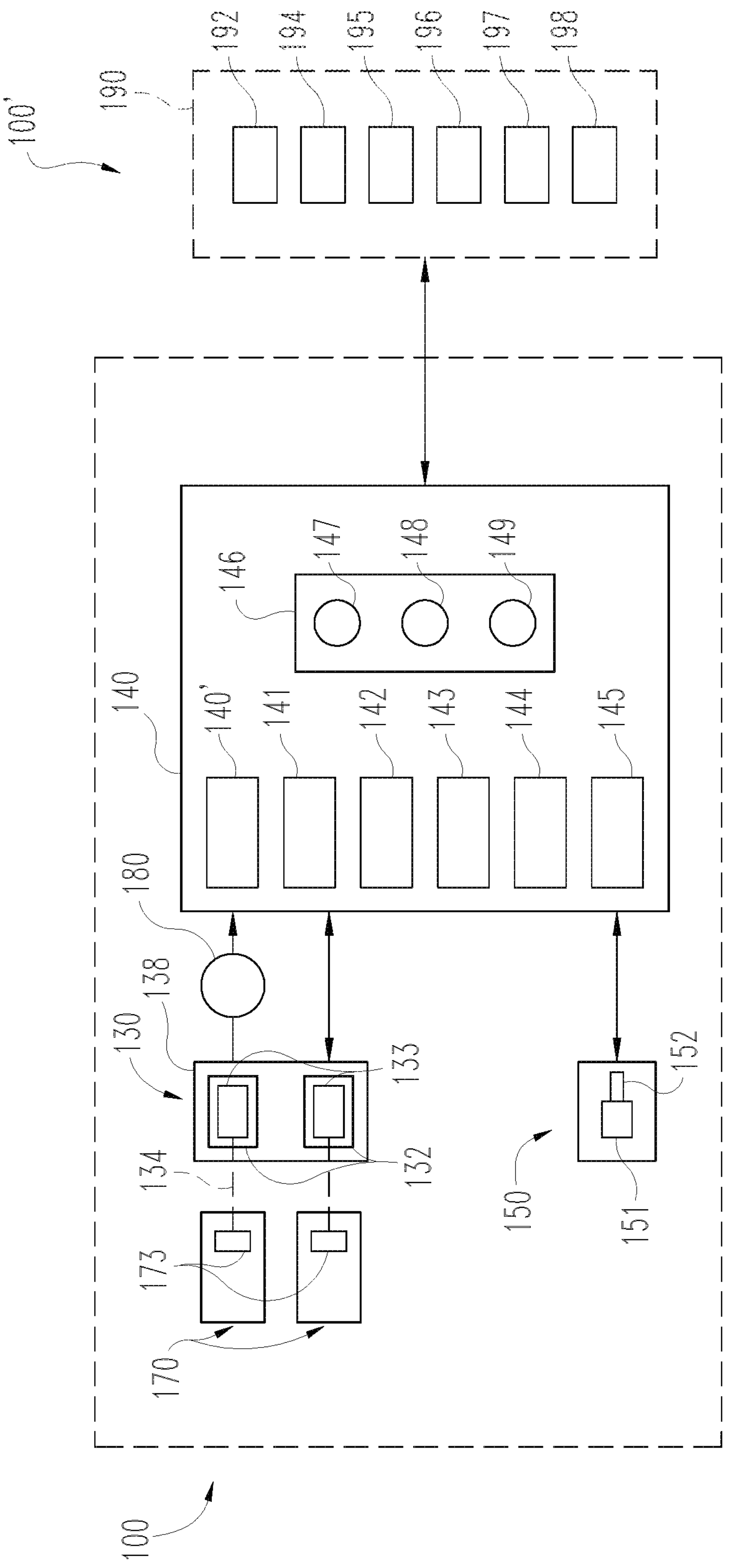
FIG. 2 is a schematic block diagram of an access control system including the lock cylinder illustrated in FIG. 1.

With additional reference to FIG. 2, the sensor assembly 130 is positioned in the plug 120, and includes a plurality of key height sensors 132 structured to sense the bitting profile 93 of the key 90. The sensor assembly 130 may further include a key insertion sensor 131 configured to sense when the key 90 has been fully inserted in the keyway 121. For example, the key insertion sensor 131 may be positioned near the distal end of the keyway 121, and the tip of the key 90 may actuate the key insertion sensor 131 when the key 90 is fully inserted.

As described in further detail below, each of the sensors 132 is structured to generate an output signal 180, and the sensor assembly 130 is structured to generate an output signal set 1080 (FIGS. 5*a*-5*c*) including the output signals 180 of the sensors 132. Each of the sensors 132 includes or is connected to at least one sensing region 133, which may be mounted on a printed circuit board (PCB) 138. The PCB 138 may be positioned in the longitudinal channel 129 such that the sensing regions 133 are operable to engage or otherwise interact with the key followers 170 through the lateral channels.

Each of the sensing regions 133 is associated or linked with a corresponding one of the key followers 170 via an associative interaction or link 134. As a result of the link 134, each of the sensors 132 is associated with the corresponding key follower 170 such that the output signal 180 of the sensor 132 varies in response to transverse movement of the key follower 170. In other words, the output signal 180 of each sensor 132 is correlated to the transverse position of the corresponding key follower 170 such that the transverse position of each key follower 170 can be determined based upon the output signal 180 of the corresponding sensor 132.

Each tumbler set 160 includes a key follower or bottom pin 170 slidably received in one of the plug tumbler shafts 126. In the illustrated form, each tumbler set 160 also includes a top or driving pin 161, and may further include one or more intermediate pins 162. As a result, each tumbler set 160 includes at least one break point 164, and each of the break points 164 is formed at an interface between two pins in the tumbler set 160. Additionally, each tumbler set 160 has a spring 168 associated therewith. In the illustrated form, the springs 168 are positioned in the shell tumbler shafts 116 and urge the tumbler sets 160 toward the keyway 121.

The lock cylinder 100 includes a plurality of tumbler chambers 106, and each tumbler set 160 is movably positioned in one of the tumbler chambers 106. In the illustrated form, each of the tumbler chambers 106 includes one of the shell tumbler shafts 116 and a corresponding one of the plug tumbler shafts 126. It is also contemplated that one or more of the tumbler chambers 106 may be of another form. For example, in certain embodiments, each tumbler set 160 may include only a bottom pin or key follower 170. In such forms, the shell tumbler shafts 116 may be omitted, and each tumbler chamber 106 may include only the plug tumbler shaft 126.

Each key follower or bottom pin 170 includes a body portion 172, a sensor interface 173, and a key engagement surface 179. Each sensor interface 173 faces the sensing region 133 of the sensor 132 with which the key follower 170 is associated, and an associative link 134 is formed between each of the key followers 170 and the corresponding one of the sensors 132. As a result, each of the key followers 170 is associated with a corresponding one of the sensors 132 such that the output signal 180 of each sensor 132 varies in response to transverse movement of the corresponding key follower 170.

The lock cylinder 100 includes a plurality of sets of related elements, and each set of related elements may be substantially similar. For example, each of the key followers

170 is associated with a corresponding one of the sensors 132, and the interaction between each key follower 170 and the corresponding one of the sensors 132 is substantially similar. In the interest of conciseness, certain descriptions hereinafter may be made with reference to a single set of corresponding or related elements. By way of example, the above description regarding the sensor interfaces 173 and the sensing regions 133 may be written more concisely as "the sensor interface 173 faces the sensing region 133, and an associative link 134 is formed between the key follower 170 and the sensor 132." It is to be understood that such descriptions are made with reference to a single set of related or associated elements, and may be equally applicable to the other sets of elements that correspond to those referenced in the description.

In the illustrated form, the controller 140 includes a processor 140' and a plurality of units 141-145, including a tamper detection unit 141, a sensor communication unit 142, a key profile generation unit 143, an action selection unit 144, and an action performance unit 145. Each of the units 141-145 may be configured to perform one or more of the operations described below with reference to FIG. 6. The controller 140 may further include a memory 146 in the form of a non-transitory computer readable medium having information or data stored thereon. For example, the memory 146 may have stored thereon authorization and criteria data 147, one or more look-up tables 148, and/or instructions 149 which, when executed by the processor 140', cause the controller 140 to perform one or more of the actions associated with the units 141-145. The controller 140 may, for example, be provided in the form of a computing device such as that described below with reference to FIG. 17.

The controller 140 is in communication with the sensor assembly 130, and may further be in communication with the electronic locking mechanism 150. As described in further detail below, the tamper detection unit 141 is configured to detect tampering events, the sensor communication unit 142 is configured to receive information from the sensor assembly 130, the key profile generation unit 143 is configured to generate a key profile based upon the information received from the sensor assembly 130, the action selection unit 144 is configured to select an action based upon the key profile, and the action performance unit 145 is configured to perform the selected action to cause the selected action to be performed. For example, the action performance unit 145 may issue to the electronic locking mechanism 150 a command related to the action, and the electronic locking mechanism 150 may perform the action in response to the command.

The electronic locking mechanism 150 is in communication with the controller 140, and is configured to transition between a locking state and an unlocking state in response to commands from the controller 140. For example, the actuator 151 may include an armature 152 having a locking position and an unlocking position corresponding to the locking and unlocking states of the electronic locking mechanism 150. In certain embodiments, the electronic locking mechanism 150 may be a clutch device operable to selectively couple the plug 120 to the tailpiece 102, for example as described below with reference to FIGS. 10-12.

In other embodiments, the electronic locking mechanism 150 may be configured to move the armature 152 to selectively prevent rotation of the plug 120. In certain forms, the armature 152 may indirectly prevent rotation the plug 120 by retaining a sidebar in a position in which the sidebar crosses shear line 101, for example as described below with reference to FIGS. 7-9. In other embodiments, the armature 152 may directly prevent rotation of the plug 120 by crossing the shear line 101, for example as described below with reference to FIGS. 13-15.

In certain embodiments, the electronic locking mechanism 150 may supplement or act in parallel to the mechanical locking mechanism 105. In other embodiments, the locking assembly 108 need not include a mechanical locking mechanism 105, and the locked/unlocked state of the cylinder 100 may be defined only by the locking/unlocking state of the electronic locking mechanism 150. In further embodiments, the electronic locking mechanism 150 may be omitted, and the locking assembly 108 may rely solely on a mechanical locking mechanism 105.

The controller 140 may further be in communication with an external system 190. In certain forms, the controller 140 may be operable to update the information stored on the memory 146 based upon information received from the external system 190. The external system 190 may include one or more of a power supply 192, a server 194, a mobile device 195, a display 196, an alarm 197, and a gateway 198. The power supply 192 may be configured to supply electrical power to the controller 140, and the controller 140 may condition the power and/or direct the power to other elements of the lock cylinder 100. The server 194 may be configured to store information relating to the operation of the cylinder 100, such as audit trails and/or authorization data. The mobile device 195 may, for example, comprise a tablet computer or a smartphone accessible to an authorized user of the cylinder 100. The display 196 may be operable to display information relating to the operation of the cylinder 100, such as instructions and/or audit information. The alarm 197 may be operable to provide audible and/or visual alerts in the event of an attack on the cylinder. The gateway 198 may be configured to transmit signals or commands between the controller 140, the server 194, the mobile device 195, the display 196, and/or the alarm 197.

In certain forms, the lock cylinder 100 may be provided as a portion of an access control system 100'. The access control system 100' may include one or more elements of the external system 190, and may additionally or alternatively include other elements not specifically illustrated in the Figures. By way of example, the access control system 100' may include a lockset including the lock cylinder 100. In such forms, the lockset may be actuated by rotation of the tailpiece 102 such that the plug 120 must be operable to rotate the tailpiece 102 in order to actuate the lockset.

With additional reference to FIGS. **3*a* and 3*b*, each of the sensors 132 is structured to generate an output signal 180 which correlates to the transverse (Z) position of the associated key follower 170. More specifically, transverse movement of the key followers 170 alters a variable characteristic of the associated sensor 132, thereby altering the output signal 180 of the sensor 132. For example, the first (i.e. most proximal) key follower 170*a* is associated with the first sensor 132*a*, such that the output signal 180*a* (FIG. 3*b*) of the first sensor 132*a* varies in response to the transverse position of the first key follower 170*a*. Additionally, the transverse position of each key follower 170 depends upon the root depth 80 of the portion of the key 90 with which the key follower 170 is engaged. Thus, when a key follower 170 is engaged with one of the bittings 92, the root depth 80 of the bitting 92 can be determined based upon the output signal 180 of the corresponding sensor 132**.

FIG. **3*a* illustrates a graph 107 which correlates values of the output signals 180 to corresponding key heights or root depths 80. For example, when a key follower 170 is engaged with a bitting 92 having the bitting height 85, the output signal 180 has the corresponding output signal value 185. Data relating to the graph 107 may, for example, be stored in a look-up table 148 such that the controller 140 is capable of determining the transverse (Z) position of each key follower 170 based upon the output signal 180 of the corresponding sensor 132. Additionally, while the graph 107 illustrates a linear relationship between the output signal 180 and the key height 80, it is also contemplated that there may be a non-linear relationship between the output signal 180 and the key height 80**.

Figure 3B:
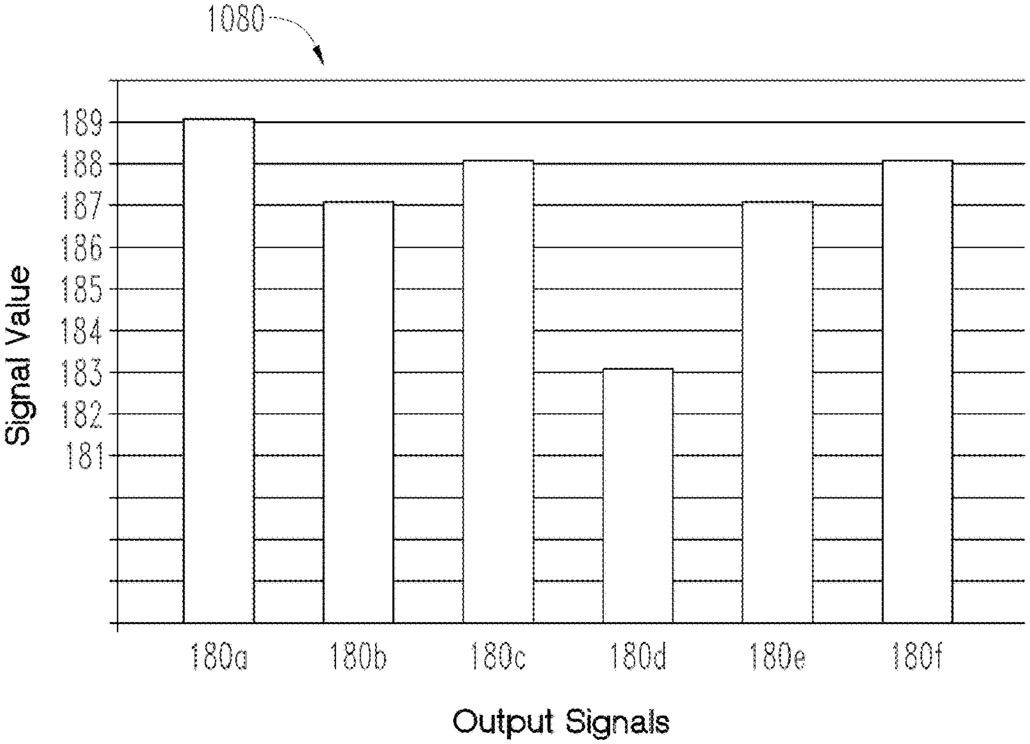
FIG. 3*b* is a graph of an illustrative output signal set generated by the lock cylinder illustrated in FIG. 1.
Figure 4:
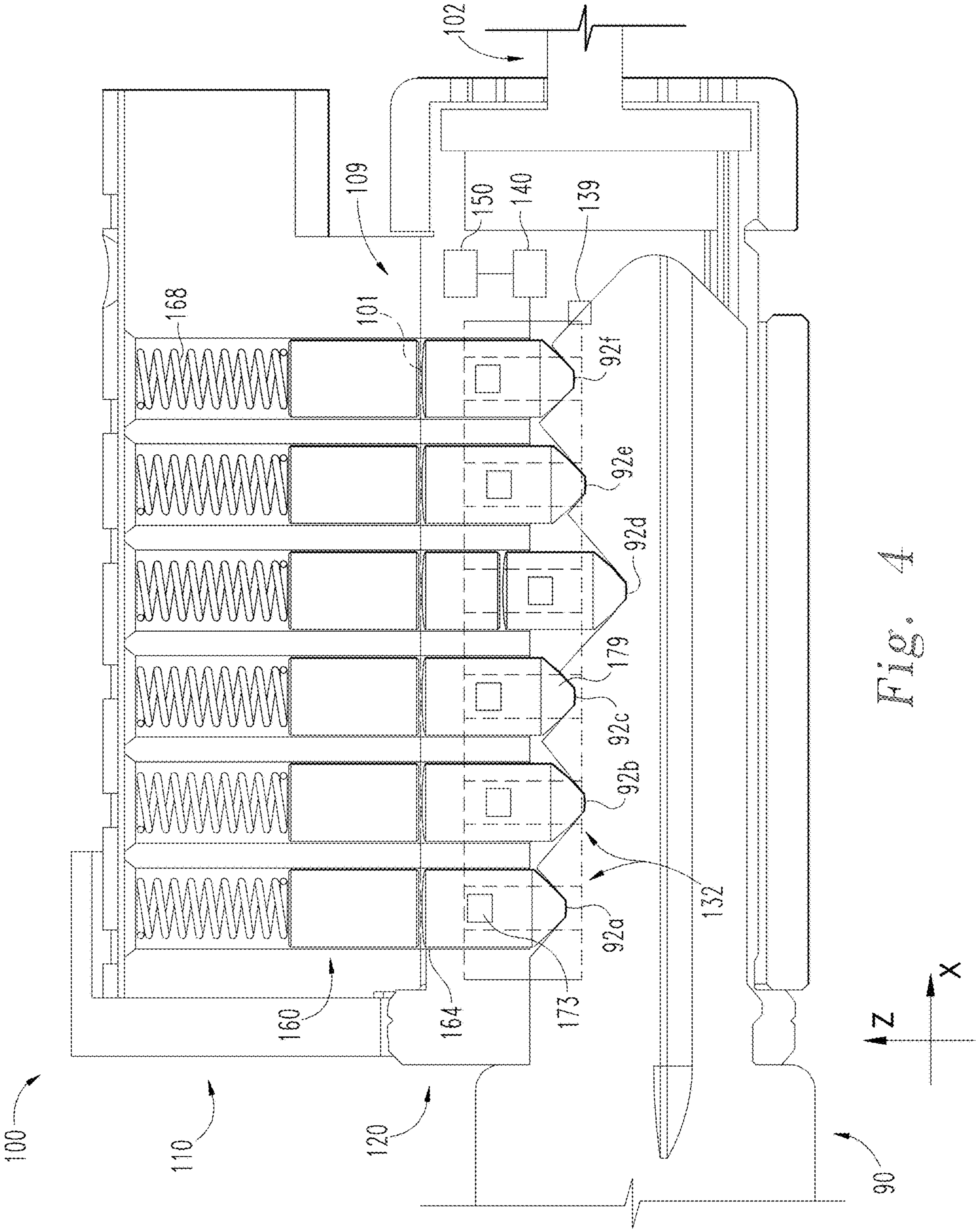
FIG. 4 is a cross-sectional illustration of the lock cylinder illustrated in FIG. 1 with the key fully inserted.

FIG. 3*b* illustrates an exemplary output signal set 1080 when the key 90 is fully inserted. With the key 90 fully inserted (FIG. 4), each bitting 92*a*-92*f* is engaged with the corresponding key follower 170*a*-170*f*. As a result, each output signal 180*a*-180*f* in the output signal set 1080 has a value corresponding to the root depth 80 of the bitting 92 with which the corresponding one of the key followers 170*a*-170*f* is engaged. Additionally, the bittings 92 define the bitting profile of the edge cut 94 as an authorized bitting profile, such that each of the tumbler sets 160 has a break point 164 aligned with the shear line 101 when the key 90 is fully inserted.

Figure 5A:
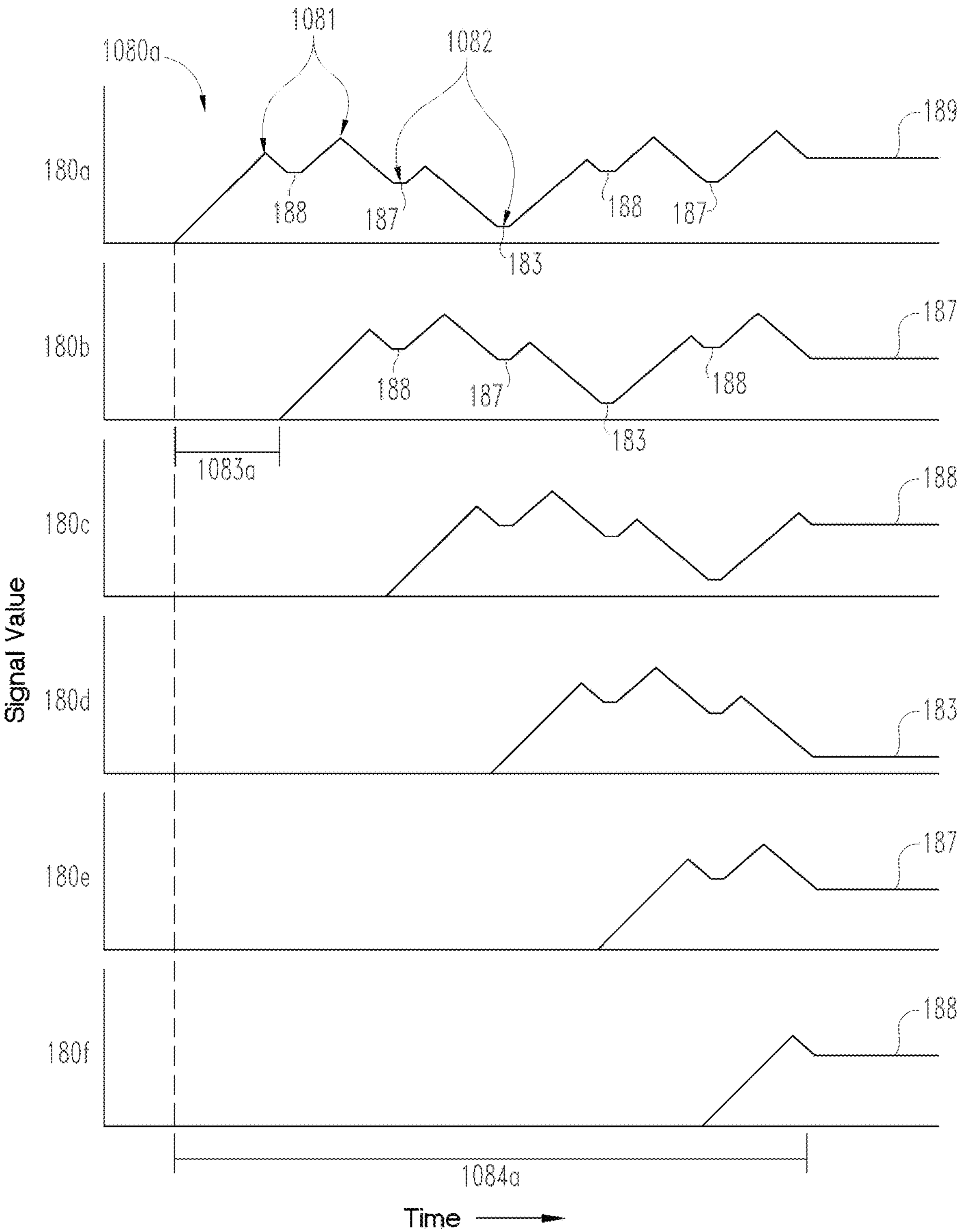
FIGS. 5*a*-5*c* illustrate output signal sets generated by the lock cylinder illustrated in FIG. 1 during a key insertion event, a picking event, and a bumping event, respectively.
Figure 5C:
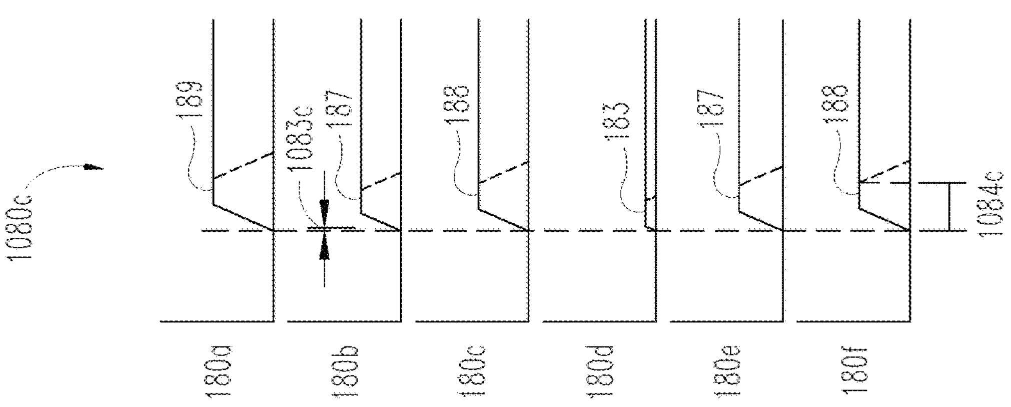
Figure 5B:
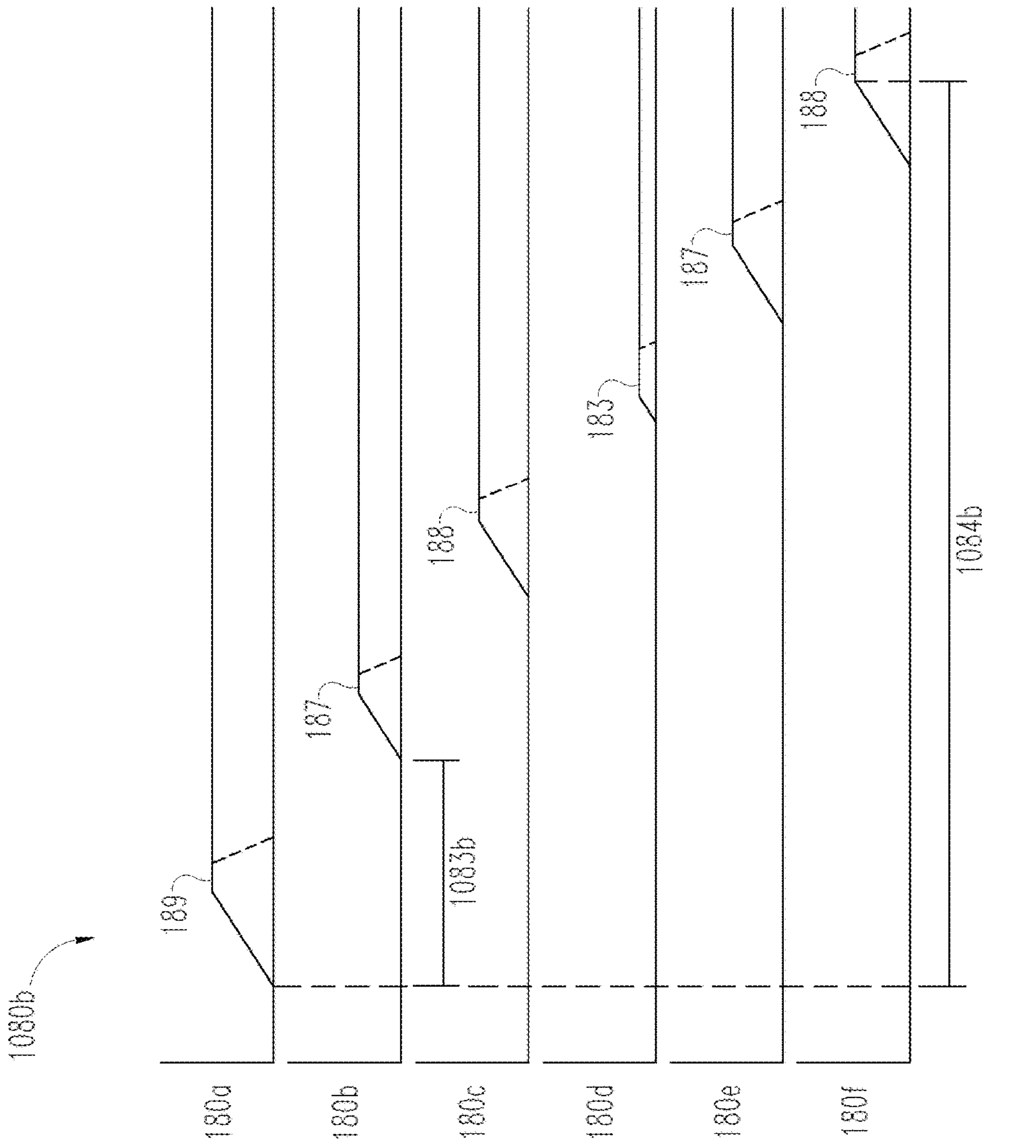

FIGS. 5*a*-5*c* illustrate exemplary forms of the output signal set 1080 versus time during various events. More specifically, FIG. 5*a* illustrates an output signal set 1080*a* during a standard key insertion event, FIG. 5*b* illustrates an output signal set 1080*b* during an example picking event, and FIG. 5*c* illustrates an output signal set 1080*c* during an example bumping event.

FIG. 5*a* illustrates an output signal set 1080*a* during a normal key insertion event. As the key 90 is inserted into the keyway 121, the output signal 180*a* of the first sensor 132*a* begins to vary when the edge 95 of the key 90 engages the first key follower 170*a*. In certain forms, a sensor 132 may be considered to be inactive until the corresponding key follower 170 is engaged by the edge 95, and movement of the key follower 170 may be considered to activate the corresponding sensor 132. As the key 90 continues to be inserted, the edge 95 engages each of the remaining key followers 170*b*-170*f* in sequence, thereby sequentially activating the remaining sensors 132*b*-132*f*, and causing the output signals 180*b*-180*f* to vary accordingly. Each of the output signals 180 includes a number of inflection points corresponding to the edge cut 94 of the key 90. More specifically, the output signals 180 include peaks 1081 corresponding to the vertices of the teeth 97 and troughs 1082 corresponding to the bittings 92. As described in further detail below, when the key 90 is fully inserted, the output signal set 1080*a* may be utilized to generate a key profile indicative of the bitting profile 94 of the key 90.

Two common forms of attacking or tampering with a lock cylinder are commonly referred to as "picking" and "bumping." In each of these forms, a torque may be applied to the plug 120, thereby causing a slight misalignment between the shell tumbler shafts 116 and the plug tumbler shafts 126. While the top pin 161 prevents rotation of the plug 120 from the home position, the slight misalignment causes the inner surface of the shell 110 to impinge upon the tumbler chambers 106, thereby defining a ledge within each of the tumbler chambers 106 at the shear line 101.

FIG. 5*b* illustrates an exemplary output signal set 1080*b* during a picking event. During such an event, the attacker may begin by slowly urging the first key follower 170*a* in the "upward" ($Z^+$) direction, thereby causing a gradual increase in the value of the first output signal 180*a*. When a break point 164 of the first tumbler set 160 becomes aligned with the ledge, the resistive force of the tumbler set 160 changes, thereby indicating to the attacker that the break point 164 is aligned with the shear line 101. The attacker therefore stops moving the first key follower 170*a*, and the first output signal 180*a* maintains a constant value until the attacker disengages the picking tool from the first key follower 170*a* to begin manipulating the second key follower 170*b*. This process is repeated for the remaining key followers 170*b*-170*f* until each of the tumbler sets 160 has a break point 164 aligned with the shear line 101, at which point the cylinder 100 is in the unlocked state.

In certain embodiments, the lock cylinder 100 may be installed in a vertical orientation such that the shell tumbler shafts 116 are positioned above the plug tumbler shafts 126. In other words, the lock cylinder 100 may be installed such that the "upward" ($Z^+$) and "downward" ($Z^-$) directions are upward and downward directions with respect to the environment. In such embodiments, the key followers 170 may return to the lowermost home positions under the force of gravity once the picking tool is no longer engaged with the key follower 170. As a result, each output signal 180 may remain constant for a relatively short time while the picking tool is engaged with the key follower 170, and may subsequently fall to the base value (as illustrated in phantom) when the attacker begins to manipulate the subsequent key follower 170.

FIG. 5*c* illustrates an exemplary output signal set 1080*c* during a bumping event. During such an event, the attacker simultaneously exerts a large "upward" ($Z^+$) force on each of the tumbler sets 160, thereby urging the top pins 161 into the shell tumbler shafts 116 as the key followers 170 travel to the unlocking positions thereof. As a result, each of the tumbler sets 160 has a break point 164 aligned with the shear line 101, and the cylinder 100 is in the unlocked state. Due to the movement of the key followers 170, the output signals 180 rapidly and contemporaneously rise to their "final" values. Additionally, while the ledges in the tumbler chambers 106 prevent the key followers 170 from entering the shell tumbler shafts 116, the key followers 170 remain free to move within the plug tumbler shafts 126. Thus, when the cylinder 100 is installed in the above-described vertical orientation, the output signals 180 may rapidly decrease to the base values thereof (as illustrated in phantom) as the key followers 170 return to the home positions under the force of gravity.

Each of the output signal sets 1080 exhibits a number of characteristics which may be utilized as criteria to determine whether the output signal set 1080 is the result of a normal key insertion event or a tampering event. One such characteristic is the number of peaks 1081 in each of the output signals 180. For example, each of the output signals 180 in the key insertion output signal set 1080*a* has peaks 1081, whereas the tampering output signal sets 1080*b*, 1080*c* do not exhibit such peaks 1081. As such, the presence or absence of peaks 1081 may be one criterion utilized to determine whether the output signal set 1080 corresponds to a key insertion event or a tampering event.

Additionally, each output signal 180 in the key insertion output signal set 1080*a* has a number of peaks 1081 corresponding the number of teeth 97 which engage the corresponding key follower 170, which is in turn a function of the longitudinal position of the key follower 170. For example, the first output signal 180*a* has six peaks 1081 due to the fact that each of the six teeth 97 engages the first key follower 170*a*. In contrast, the second output signal 180*b* has five peaks 1081, due to the fact that only five of the teeth 97 engage the second key follower 170*b* as the key 90 is inserted. As such, a normal key insertion event may be determined when each of the output signals 180 in an output signal set 1080 includes the correct number of peaks 1081.

The number and values of the troughs 1082 may similarly be used to determine whether an output signal set 1080 is the result of a normal key insertion event. For example, the first output signal 180*a* in the key insertion output signal set 1080*a* exhibits five troughs 1082 prior to coming to a final value, whereas the output signals 180 of the tampering output signal sets 1080*b*, 1080*c* do not exhibit troughs 1082. Additionally, the values of the troughs 1082 for each output signal 180*a*-180*f* are equal to the final values of another of the output signals 180*a*-180*f*. For example, in the first output signal 180*a*, the troughs 1082 have the values 188, 187, 183, 188, 187, which correspond to the final values of the sixth through second output signals 180*f*, 180*c*, 180*d*, 180*c*, and 180*b*, respectively. Similarly, the troughs 1082 of the second output signal 180*b* have the values 188, 187, 183, 188, which correspond to the final values of the sixth through third output signals 180*f*, 180*e*, 180*d*, and 180*c*, respectively. Thus, a normal key insertion event may be determined when each of the troughs 1082 in an output signal 180*a*-180*f* has a value equal to the final value of a corresponding one of the other output signals 180*a*-180*f*.

Another criterion which may be utilized in determining whether an output signal set 1080 corresponds to a normal key insertion event is the alignment of the troughs 1082. Due to the fact that the bittings 92 and the key followers 170 are evenly spaced in the longitudinal direction, the troughs 1082 of the output signals 180 are substantially aligned in the time direction. Thus, a normal key insertion event may be determined when the troughs 1082 of the activated key sensors 132 occur contemporaneously.

An additional characteristic which may be utilized to determine whether an output signal set 1080 corresponds to a key insertion event is the time between activation of the sensors 132. In the key insertion output signal set 1080*a*, each of the sensors 132*a*-132*f* are activated rapidly and in sequence as the key 90 is inserted, and the time 1083*a* between sensor activation events is substantially constant. In contrast, the picking output signal set 1080*b* has a greater amount of time 1083*b* between sensor activation events, as that the attacker must place the first key follower 170*a* in the proper position and subsequently reposition the picking tool to engage the next key follower 170*b*. In the bumping output signal set 1080*c*, each of the sensors 132 is activated at substantially the same time as the bumping force is simultaneously applied to all key followers 170, such that the time 1083*c* between sensor activation events is substantially zero. Thus, a picking event may be determined when the time 1083 between sensor activation events exceeds an upper threshold value, a bumping event may be determined when the time 1083 between sensor activation events falls below a lower threshold value, and/or a normal key insertion event may be determined when the time 1083 between sensor activation events falls between the upper and lower threshold values.

It is to be understood that the foregoing characteristics are intended to be illustrative in nature, and that additional or alternative criteria may be utilized to determine whether a tampering event has occurred. In one example, the total time 1084 between activation of the first sensor 132*a* and the beginning of a steady value for the last sensor 132*f* may be utilized as a criterion. In such forms, a total time 1084*b* greater than an upper threshold may indicate a picking event, a total time 1084*c* less than a lower threshold may indicate a bumping event, and a total time 1084*a* between the upper and lower thresholds may indicate a normal key insertion event. Additionally, a sensor output signal set 1080 may be determined to be the result of tampering when the output signals 180 do not simultaneously maintain the appropriate final values for a predetermined time, for example when the lock cylinder 100 is installed in the above-described vertical orientation.

As noted above, the illustrated locking assembly 108 includes both a mechanical locking mechanism 105 in the form of the tumbler sets 160, and an electronic locking mechanism 150, each of which is independently operable to selectively prevent the plug 120 from rotating the tailpiece 102. In other forms, the mechanical locking mechanism 105 may be omitted, and the locked/unlocked state of the cylinder 100 may be defined entirely by locking/unlocking state of the electronic locking mechanism 150. Further details regarding potential features of such embodiments are described below with reference to the lock cylinder 200.

Figure 6:
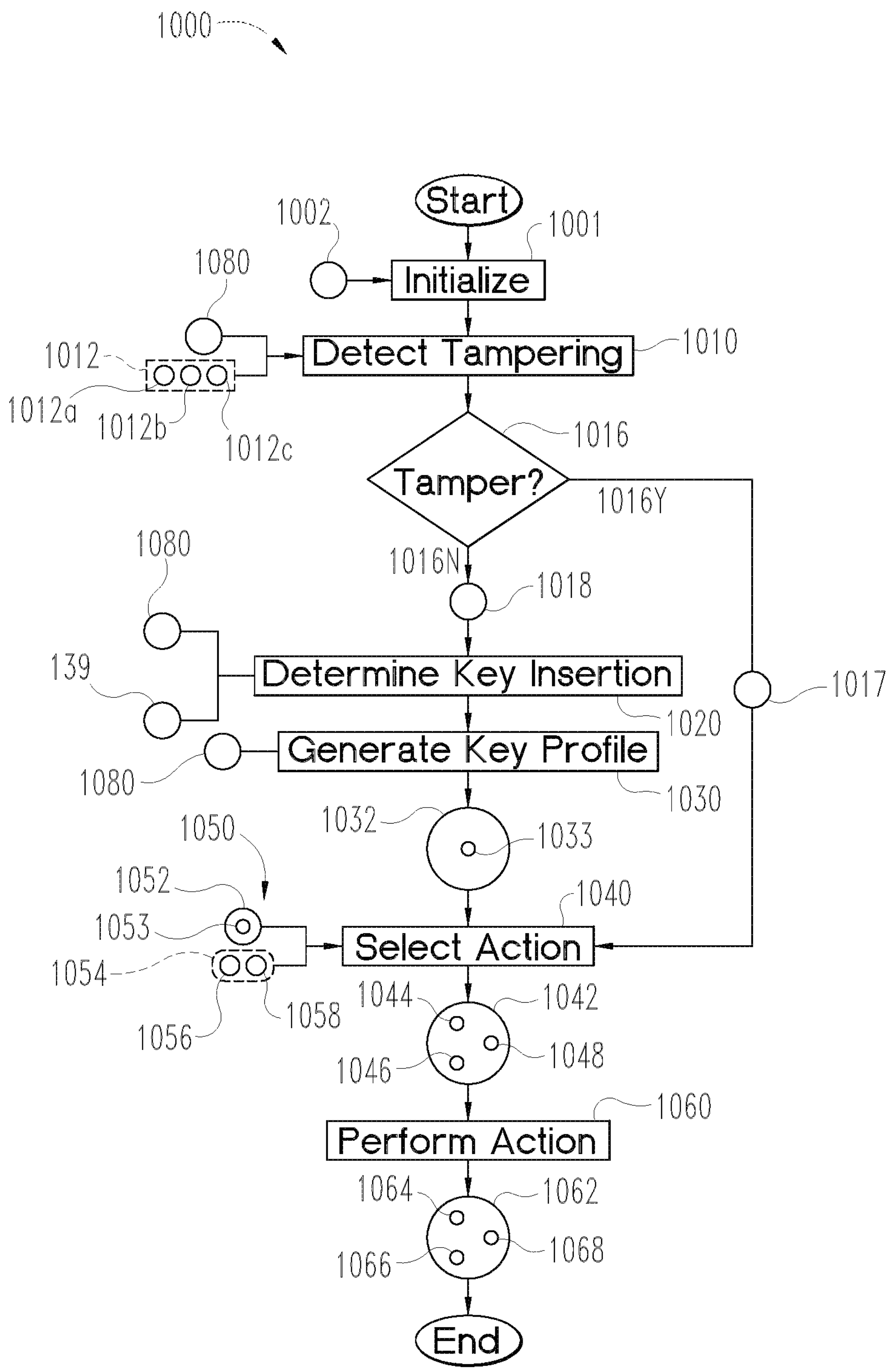
FIG. 6 is a schematic flow diagram of a process according to one embodiment.

With additional reference to FIG. 6, illustrated therein is an exemplary process 1000 which may be performed using the lock cylinder 100. Operations illustrated for the processes in the present application are understood to be examples only, and operations may be combined or divided, and added or removed, as well as re-ordered in whole or in part, unless explicitly stated to the contrary. Unless specified to the contrary, it is contemplated that certain operations or steps performed in the process 1000 may be performed wholly by the sensor assembly 130, controller 140, electronic locking mechanism 150, and/or external system 190, or that the operations or steps may be distributed among one or more of the elements and/or additional devices or systems which are not specifically illustrated in the Figures.

The process 1000 may begin with an initializing operation 1001. The operation 1001 may include shifting the controller 140 from a low-power or sleep mode to an active mode, for example by providing the controller 140 with the appropriate amount of power from the power supply 192. The operation 1001 may be performed in response to an initializing action 1002, such as insertion of the key 90 into the keyway 121. In such forms, the initializing action 1002 may be detected by the first sensor 132*a*. For example, when the key 90 engages the first key follower 170, the first output signal 180*a* changes, thereby indicating that the initializing action 1002 has occurred. The process 1000 may continue to a tamper detection operation 1010 upon detection of the initializing action 1002.

The operation 1010 includes receiving the output signal set 1080 and comparing the output signal set 1080 with one or more criteria 1012 to determine whether a tampering event has occurred. The criteria 1012 may be stored on the memory 146 in the authorization and criteria data 147. By way of example, the criteria 1012 may include key insertion event criteria 1012*a*, and tampering event criteria such as picking event criteria 1012*b* and/or bumping event criteria 1012*c*. In such forms, the operation 1010 may include determining that an output signal set 1080 is a normal output signal set 1080*a* when the key insertion event criteria 1012*a* are met, determining that the output signal set 1080 is a picking output signal set 1080*b* when the picking event criteria 1012*b* are met, and determining that the output signal set 1080 is a bumping output signal set 1080*c* when the bumping event criteria 1012*c* are met. The criteria 1012 may, for example, include one or more of the above-described criteria relating to the characteristics of the output signal sets 1080. The operation 1010 may be performed using the tamper detection unit 141 and the sensor communication unit 142.

The operation 1010 may further include determining one of a tampering event 1017 and a normal key insertion event 1018 in response to the comparison of the output signal set 1080 with the criteria 1012. For example, the tampering event 1017 may be determined when the output signal set 1080 does not meet the normal key insertion event criteria 1012*a* and/or when the output signal set 1080 meets either of the picking event criteria 1012*b* and the bumping event criteria 1012*c*. Similarly, the normal key insertion event 1018 may be determined when the output signal set 1080 meets the normal key insertion event criteria 1012*a* and/or does not meet either of the picking event criteria 1012*b* and the bumping event criteria 1012*c*. As indicated in the conditional 1016, the process 1000 may proceed to either of two operations based upon the determined event 1017, 1018. More specifically, the process 1000 may proceed to an operation 1040 when a tampering event 1017 is determined (1016Y), and may proceed to an operation 1080 when a normal key insertion event 1018 is determined (1016N).

The operation 1020 includes determining whether the key 90 has been fully inserted into the keyway 121. In certain forms, the operation 1020 may include determining the key 90 has been fully inserted based upon the output signal set 1080. For example, full key insertion may be determined when the output signal set 1080 meets the key insertion event criteria 1012*a*, or when each of the output signals 180 remains constant for a predetermined amount of time. Additionally or alternatively, full key insertion may be determined based upon the output of the key insertion sensor 131. The operation 1020 may be performed, for example, with the sensor communication unit 142.

When the key 90 is fully inserted, the transverse position of each of the key followers 170 corresponds to the key height 80 at the bitting 92 with which the key follower 170 is engaged. Additionally, the output signal 180 of each of the sensors 132 corresponds to the transverse position of the key follower 170. As such, each of the output signals 180 is indicative of the key height 80 at the bitting 92 with which the key follower 170 is engaged. The bitting code 93 of the key 90 can therefore be determined based upon the values of the output signals 180 in the output signal set 1080 when the key 90 is fully inserted. When full key insertion is determined, the process 1000 may continue to an operation 1030.

The operation 1030 includes generating a key profile 1032 based upon the output signal set 1080. The key profile 1032 includes information relating to the bitting code 1033 of the key 90. The operation 1030 may include comparing each of the output signals 180 to a look-up table 148 including information which correlates values of the output signal 180 to a corresponding bitting height 80, such as information relating to the graph 107. For example, when the output signal 180*a* of the first sensor 132*a* has the value 189, the key profile 1032 may include information indicating that the first bitting 92*a* has a bitting value of 9. In other words, the key profile 1032 may include information indicating that the first digit of the bitting code 1033 is 9. The bitting code 1033 may include a string of digits relating to the bitting heights 80 at each of the bittings 92. For example, the bitting code 1033 of the illustrated key 90 may be represented as "978378." The operation 1030 may be performed with the key profile generation unit 143.

The process 1000 may continue to an operation 1040, which includes selecting an action 1042 based at least in part upon the event 1017, 1018 determined in the operation 1010. For example, when the tampering event 1017 has been detected, the operation 1040 may include selecting the action 1042 based upon the tampering event 1017. When the key insertion event 1018 has been detected, the operation 1040 may include selecting the action 1042 based upon the key profile 1032 by comparing the key profile 1032 to authorization data 1050, and selecting the action 1042 based upon the comparing. As described in further detail below, the selected action 1042 may include one or more of an unlock action 1044, a rekey action 1046, and a reporting action 1048. The operation 1040 may be performed with the action selection unit 144.

The authorization data 1050 may include one or more reference key profiles 1052, each of which may include information relating to a reference bitting code 1053. The authorization data 1050 may further include additional information 1054 associated with one or more of the reference key profiles 1052. The additional information 1054 associated with a reference key profile 1052 may include action information 1056 and/or scheduling information 1058. For example, when the generated key profile 1032 matches a reference key profile 1052, the action 1042 may be selected based upon the action information 1056 associated with the corresponding reference key profile 1052. The scheduling information 1058 may indicate that an associated reference key profile 1052 is authorized only at certain times or for a certain number of uses.

The operation 1040 may include selecting the action 1042 based at least in part upon whether the key profile 1032 matches one of the reference key profiles 1052. If the matching reference key profile 1052 has additional information 1054 associated therewith, the action 1042 may be selected based further upon the additional information 1054. For example, when the additional information 1054 indicates that the key profile 1032 matches a reference key profile 1052 which is currently authorized to unlock the lock cylinder 100, the selected action 1042 may include the unlock action 1044. When the additional information 1054 indicates that the key profile 1032 is currently authorized to add or remove key profiles from the list of reference key profiles 1052, the selected action 1042 may include the rekey action 1046. In certain forms, the reporting action 1048 may be selected when the key profile 1032 does not match one of the reference key profiles 1052, or when the tampering event 1017 has been detected. Additionally or in the alternative, the reporting action 1048 may be selected in combination with the unlock action 1044 and/or the rekey action 1046.

The process 1000 further includes an operation 1060, which includes performing the selected action 1042, such as by issuing a signal or command 1062 associated with the selected action 1042. For example, when the selected action 1042 includes the unlock action 1044, the operation 1060 may include causing the controller 140 to issue an unlock command 1064 to the electronic locking mechanism 150 and/or causing the electronic locking mechanism 150 to transition to the unlocking state. When the selected action 1042 includes the rekey action 1046, the operation 1060 may include storing information 1066 relating to the key profile 1032 of the next key 90 inserted into the cylinder 100, and adding or removing the new key profile 1032 as an authorized reference key profile 1052.

When the selected action 1042 includes the reporting action 1048, the operation 1060 may include causing the controller 140 to issue a reporting signal 1068 to one or more elements of the external system 190. The reporting signal 1068 may, for example, include information relating to the key profile 1032 and/or the selected action 1042. In such forms, the reporting signal 1068 may be issued to the server 194 of the access control system 100' to create or update an audit trail for the lock cylinder 100. Additionally or alternatively, the reporting signal 1068 may be an alarm or alert signal, such as when the authorization data 1050 indicates that the key profile 1032 is not currently authorized, or when a tampering event 1017 has been determined. For example, an alarm reporting signal 1068 may be issued to the alarm 197, and the alarm 197 may generate an audible and/or visual alarm in response thereto. As another example, an alert reporting signal 1068 may be issued to the mobile device 195, thereby alerting a user of an unauthorized attempt to operate the lock cylinder 100. In such forms, the alert reporting signal 1068 may be issued to the gateway 198, and the gateway 198 may cause a Short Message Service (SMS) message to be issued to the mobile device 195.

Figure 7:
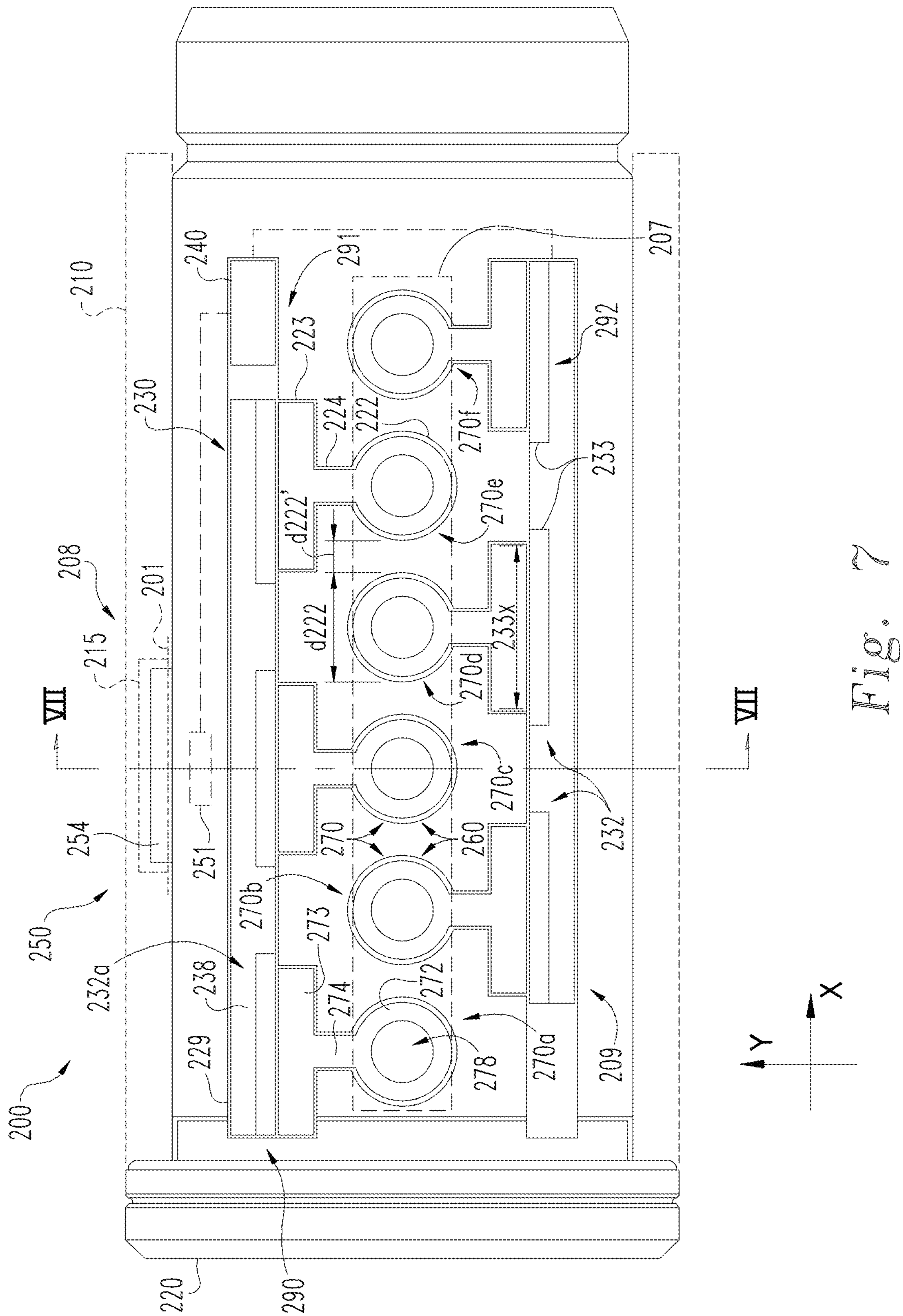
FIG. 7 is a plan view of a lock cylinder according to another embodiment.
Figure 8:
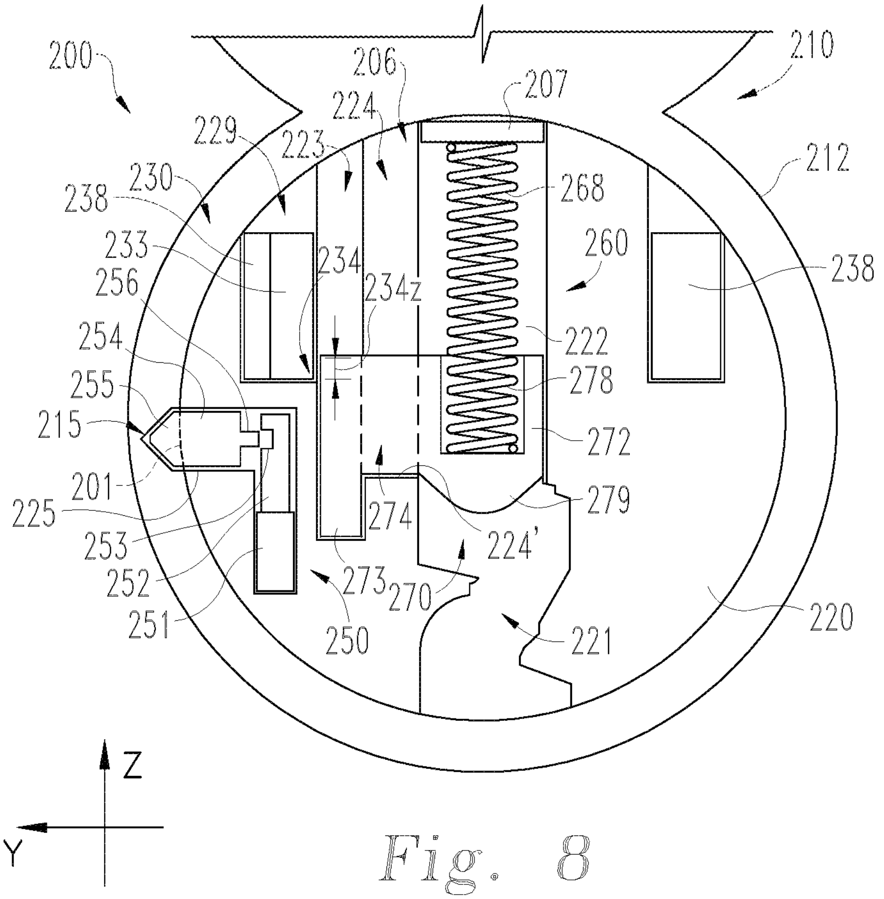
FIG. 8 is a cross-sectional illustration of the lock cylinder illustrated in FIG. 7.
Figure 9:
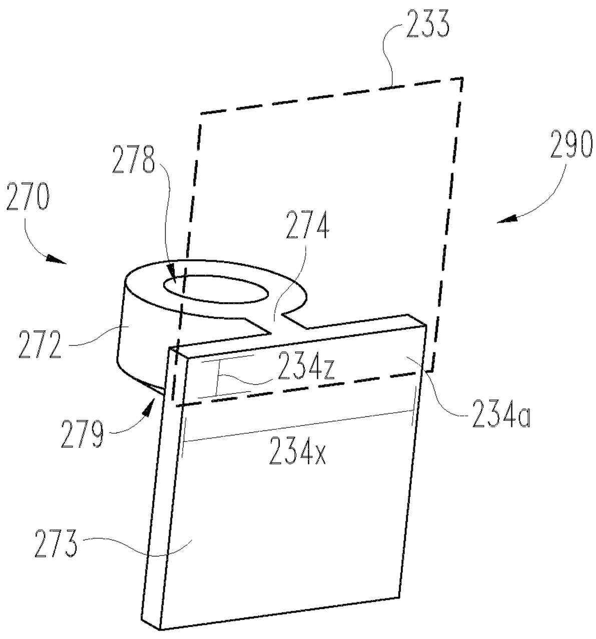
FIG. 9 is a perspective view of a portion of the lock cylinder illustrated in FIG. 7.

With reference to FIGS. 7-9, illustrated therein is a lock cylinder 200 according to one embodiment. The lock cylinder 200 may, for example, be an implementation of the above-described lock cylinder 100, and similar reference characters are used to indicate similar elements and features unless indicated otherwise. For example, the lock cylinder 200 includes a locking assembly 208 including an electronic locking mechanism 250, and a key recognition assembly 209 including a sensor assembly 230, a controller 240, and a plurality of key followers 270. In the interest of conciseness, the following description of the lock cylinder 200 is focused primarily on features which were not specifically described with reference to the above-described lock cylinder 100.

In the illustrated form, each tumbler set 260 includes one of the key followers 270 and a biasing member in the form of a spring 268, but does not include a driving pin such as the driving pin 161. As such, the tumbler sets 260 do not provide a mechanical locking function, and serve merely as elements of the key recognition assembly 209. Due to the fact that the driving pins are omitted, the shell 210 need not include shell tumbler shafts, and each of the tumbler chambers 206 may be defined entirely by the plug 220. Additionally, because the lock cylinder 200 does not include the top pins, the above-described picking and bumping attacks are ineffective. A cover plate 207 may be seated on the plug 220 to provide an anchor point for the springs 268, such that the springs 268 urge the key followers 270 toward a home position.

The plug 220 includes a pair of longitudinal channels 229 formed on opposite sides of the keyway 221, and a plurality of tumbler chambers 206 in communication with the keyway 221 and the longitudinal channels 229. Each of the longitudinal channels 229 may extend along a longitudinal-transverse (XZ) plane parallel to the keyway 221. Each tumbler chamber 206 includes a cylindrical transverse portion 222, a lateral channel 224 extending laterally from the transverse portion 222 toward the longitudinal channel 229, and a cutout 223 formed between the lateral channel 224 and the longitudinal channel 229. In the illustrated form, the lateral channels 224 extend from the transverse portions 222 in alternating lateral directions. For example, the lateral channels 224 of the first, third, and fifth tumbler chambers 206 extend in the "left" ($Y^{+}$) direction, and the lateral channels 224 of the second, fourth, and sixth tumbler chambers 206 extend in the "right" (Y) direction. In other words, in each pair of adjacent tumbler chambers 206, the lateral channels 224 extend in opposite lateral directions.

The sensor assembly 230 includes a plurality of capacitive sensors 232, each of which includes a capacitive sensing region 233. Each of the capacitive sensing regions 233 is aligned with the cutout 223 of a corresponding one of the tumbler chambers 206. For example, each of the sensing regions 233 may be formed on one of the PCBs 238, and the PCBs 238 may be seated in the longitudinal channels 229 such that each of the sensing regions 233 is aligned with one of the cutouts 223.

The electronic locking mechanism 250 includes an actuator 251 operably engaged with an armature 252. The electronic locking mechanism 250 also includes a sidebar 254 having a tapered portion 255 formed on a radially outer side thereof and a protrusion 256 formed on a radially inner side thereof. The armature 252 includes a notch 253, and the actuator 251 is operable to move the armature 252 between a locking position in which the notch 253 is misaligned with the protrusion 256 and an unlocking position in which the notch 253 is aligned with the protrusion 256. In certain forms, the actuator 251 may linearly move the armature 252 between the locking and unlocking positions. In other forms, the actuator 251 may rotate the armature 252 between the locking and unlocking positions.

The sidebar 254 is seated in a longitudinal sidebar channel 225 formed in the plug 220, and is biased toward a radially outer position by a spring. In the outer position, the sidebar 254 crosses the shear line 201, and the tapered portion 255 extends into a groove 215 formed in the shell 210. Rotation of the plug 220 causes a surface of the groove 215 to engage the tapered portion 255, thereby urging the sidebar 254 toward a radially inner position. When the armature 252 is in the locking position, the radially inward force urges the protrusion 256 into contact with the armature 252, thereby preventing radially inward movement of the sidebar 254. As a result, the plug 220 is rotationally coupled with the shell 210, and is not operable to rotate the tailpiece 202. When the armature 252 is in the unlocking position, the notch 253 is aligned with the protrusion 256, and the sidebar 254 is free to move to the radially inner position. As a result, the plug 220 is free to rotate with respect to the shell 210, and is therefore operable to rotate the tailpiece 202.

Each key follower 270 includes a body portion 272, a sensor interface in the form of a capacitive plate portion 273, and a lateral arm 274 connecting the body portion 272 to the plate portion 273. The body portion 272 may include a cup 278 structured to receive a portion of the spring 268 and/or a tapered engagement surface 279 configured to facilitate travel of the key follower 270 along the edge cut 94 as the key 90 is inserted.

With the cylinder 200 assembled, each of the key followers 270 is received in one of the tumbler chambers 206. More specifically, the body portion 272 is seated in the transverse portion 222, the plate 273 is seated in the cutout 223, and the lateral arm 274 extends through the lateral channel 224. Additionally, the lateral arms 274 extend from alternating sides of the body portions 272, such that the plates 273 are positioned on alternating sides of the keyway 221. The plate 273 overlaps a corresponding one of the sensing regions 233 such that a capacitive link 234 is formed between the key follower 270 and the corresponding one of the capacitive sensors 232, thereby defining an associated pair 290.

Each associated pair 290 includes one of the plate portions 273 and the corresponding one of the sensing regions 233. The lock cylinder 200 includes a plurality of the associated pairs 290, and more specifically includes a plurality of first associated pairs 291 positioned on a first side of the keyway 221 and a plurality of second associated pairs 292 positioned on a second side of the keyway 221. In the illustrated form, the first associated pairs 291 are positioned on the "left" ($Y^{+}$) side of the keyway 221, and the second associated pairs 292 are positioned on the "right" ($Y^-$) side of the keyway 221. Additionally, the key followers 270 alternatingly correspond to the first associated pairs 291 and the second associated pairs 292. For example, in the illustrated form, the first associated pairs 291 include the plate portions 273 of the first, third, and fifth key followers 270*a*, 270*c*, 270*e* and the corresponding sensing regions 233, while the second associated pairs 292 include the plate portions 273 of the second, fourth, and sixth key followers 270*b*, 270*d*, 270*f* and the corresponding sensing regions 233.

As a result of the capacitive link 234, the capacitance sensed by the sensor 232, and thus the output signal thereof, corresponds to the overlap area 234A through which the capacitive link 234 is formed. As such, a greater change in the overlap area 234A causes a greater change in the output signal. As the key follower 270 moves transversely, the transverse overlap 234Z varies, thereby causing a corresponding variation in the overlap area 234A and the output signal. In the illustrated form, the sensing regions 233 and plate portions 273 extend longitudinally, thereby providing a greater longitudinal overlap 234X. Additionally, due to the fact that the associated pairs 290 are positioned on alternating sides of the keyway 221, a greater longitudinal distance is available for each of the plate portions 273 and sensing regions 233 than would be available if each of the associated pairs 290 were positioned on the same side of the keyway 221.

For example, if each of the associated pairs 290 were positioned on the same side of the keyway 221, the maximum longitudinal overlap 234X would be the sum of the longitudinal length d222 of a transverse opening 222 and the longitudinal offset distance d222' between adjacent transverse openings 222. Due to the alternating orientations of the key followers 270, however, the longitudinal overlap 234X can be greater than the sum of the length d222 and the offset distance d222'. In the illustrated form, the longitudinal overlap 234X is the sum of the length d222 and twice the offset distance d222'. It is also contemplated that the longitudinal overlap 234X may be greater, and may correspond to twice the sum of the length d222 and the offset distance d222'.

When no key is inserted into the keyway 221, each key follower 270 is in a "lowermost" or home position (FIG. 8). When the key follower 270 is in the home position, the engagement surfaces 279 extend into the keyway 221, and the lateral arm 274 may be supported by a ledge 224' which defines a floor of the lateral channel 224. In the illustrated form, when the key follower 270 is in the home position, the transverse overlap 234Z is at a minimum, and the output signal of the sensor 232 is at a corresponding minimum. As the key 90 is inserted, the key follower 270 moves transversely in the "upward" ($Z^+$) direction, thereby increasing the transverse overlap 234Z. This increase in the transverse overlap 234Z causes a corresponding increase in the overlap area 234A and the output signal of the sensor 232. When the key 90 is fully inserted, each of the key followers 270 is engaged with one of the bittings 92, and has a transverse position corresponding to the bitting height 80 of the bitting 92 with which it is engaged. As a result, the output signal of each sensor 232 is indicative of the bitting height 80 of the corresponding bitting 92.

In the illustrated form, the transverse overlap 234Z is at a minimum when the key follower 270 is in the home position, and the output signal of the sensor 232 is at a corresponding minimum. As such, "upward" ($Z^+$) movement of the key follower 270 causes an increase in the transverse overlap 234Z and a corresponding increase in the output signal. In other embodiments, the transverse overlap 234Z may be at a maximum when the key follower 270 is in the home position. In such forms, "upward" ($Z^+$) movement of the key follower 270 may cause a decrease in the output signal of the sensor 232. Additionally, while the output signals of the illustrated sensors 232 increase in response to an increase in capacitance, it is also contemplated that the output signals may decrease in response to an increase in capacitance. In either event, the output signal of the sensor 232 is correlated to the transverse position of the key follower 270.

In certain forms, the process 1000 may be performed using the lock cylinder 200. One such implementation of the process 1000 will now be described. It is to be understood that the following description is intended as an exemplary use case scenario, and is not to be construed as limiting the scope of the subject matter disclosed herein. As the key 90 is inserted into the keyway 221, the edge 95 contacts the engagement surface 279 of the first key follower 270*a*, thereby urging the key follower 270*a* in the "upward" ($Z^+$) direction. As the first key follower 270*a* moves upward, the transverse overlap 2342 between the plate portion 273 and the first capacitive sensor 232*a* increases, thereby causing a corresponding increase in the output signal of the first capacitive sensor 232*a*. The controller 240 interprets the increase in the output signal of the first capacitive sensor 232*a* as the initializing action 1002 in the initializing operation 1001, and the process 1000 continues to the operation 1010.

In the operation 1010, the controller 240 monitors the output signal set 1080 generated by the capacitive sensor assembly 230 with the sensor communication unit 142, and compares the output signal set 1080 to the criteria 1012 with the tamper detection unit 141. Due to the fact that the key 90 is being inserted, the output signal set 1080 of the capacitive sensor assembly 230 matches the normal insertion event criteria 1012*a*. As a result, a normal key insertion event 1018 is determined, and the conditional 1016 directs the process 1000 to the operation 1020.

When the key 90 is fully inserted, the output signals 180 of the capacitive sensors 232 remain constant for a predetermined amount of time, and the controller 240 determines that the key 90 has been fully inserted based upon the constant values of the output signals 180 in the operation 1020. Alternatively, the operation 1020 may include determining full key insertion based upon the key insertion event 1018 determined in the operation 1010. When key insertion is determined in the operation 1020, the process 1000 continues to the operation 1030.

In the operation 1030, the controller 240 compares the values of the output signals 180 in the output signal set 1080 to information stored in the look-up table 148, and determines the bitting code 1033 of the key 90 based upon the comparing. The controller 240 then utilizes the key profile generation unit 143 to generate the key profile 1032, which includes information relating to the bitting code 1033.

In the operation 1040, the controller 240 utilizes the action selection unit 144 to compare the generated key profile 1032 to a plurality of reference key profiles 1052, and to determine that the bitting code 1033 of the key 90 matches the bitting code 1053 of one of the reference key profiles 1052. The controller 240 also evaluates the additional data 1054 associated with the matching reference key profile 1052, and determines that the key 90 is authorized to add a new key profile to the list of reference key profiles 1052. As a result, the controller 240 selects the rekey action 1046 and the reporting action 1048.

In the operation 1040, the controller 240 performs the rekey action 1046 and the reporting action 1048. More specifically, the controller 240 causes to the display 196 to indicate to the user that the rekey action 1046 has been selected. In response, the user withdraws the initial key 90 and inserts a new key 90. The operations 1020, 1030 are repeated to generate a new key profile 1032 based upon the bitting profile 94 of the new key 90, and the new key profile 1032 is stored on the memory 146 as a reference key profile 1052. Additionally, the controller 240 generates and stores action information 1056 indicating that the new reference key profile 1052 is authorized to unlock the lock cylinder 200. The controller also issues to the server 194 a reporting signal 1068 including information relating to the time and date that the rekey action 1046 has been performed, and the server 194 stores the information in an audit trail for the lock cylinder 200.

Figure 10:
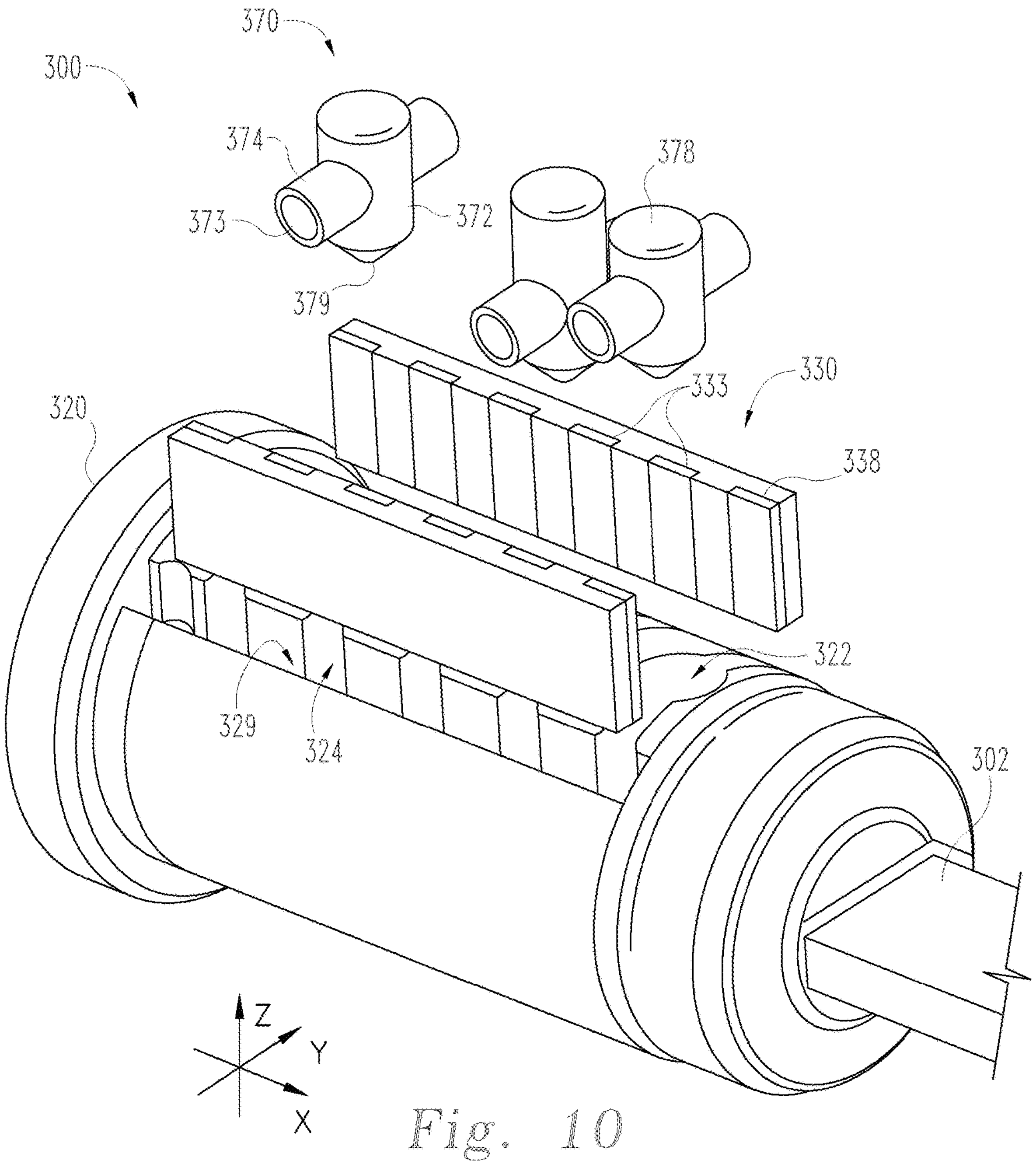
FIG. 10 is a perspective illustration of a lock cylinder according to another embodiment.
Figure 11:
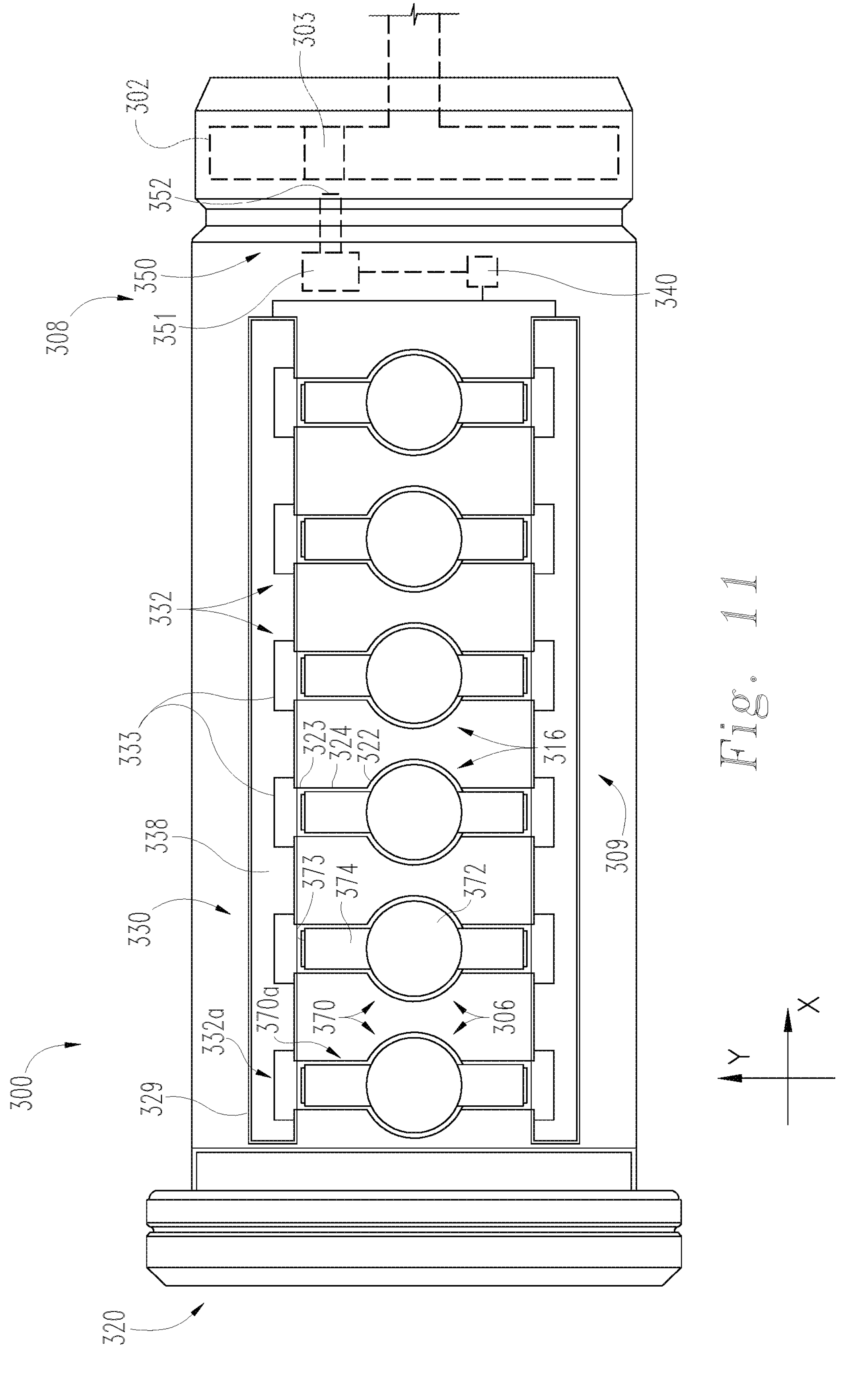
FIG. 11 is a plan view of the lock cylinder illustrated in FIG. 10.
Figure 12:
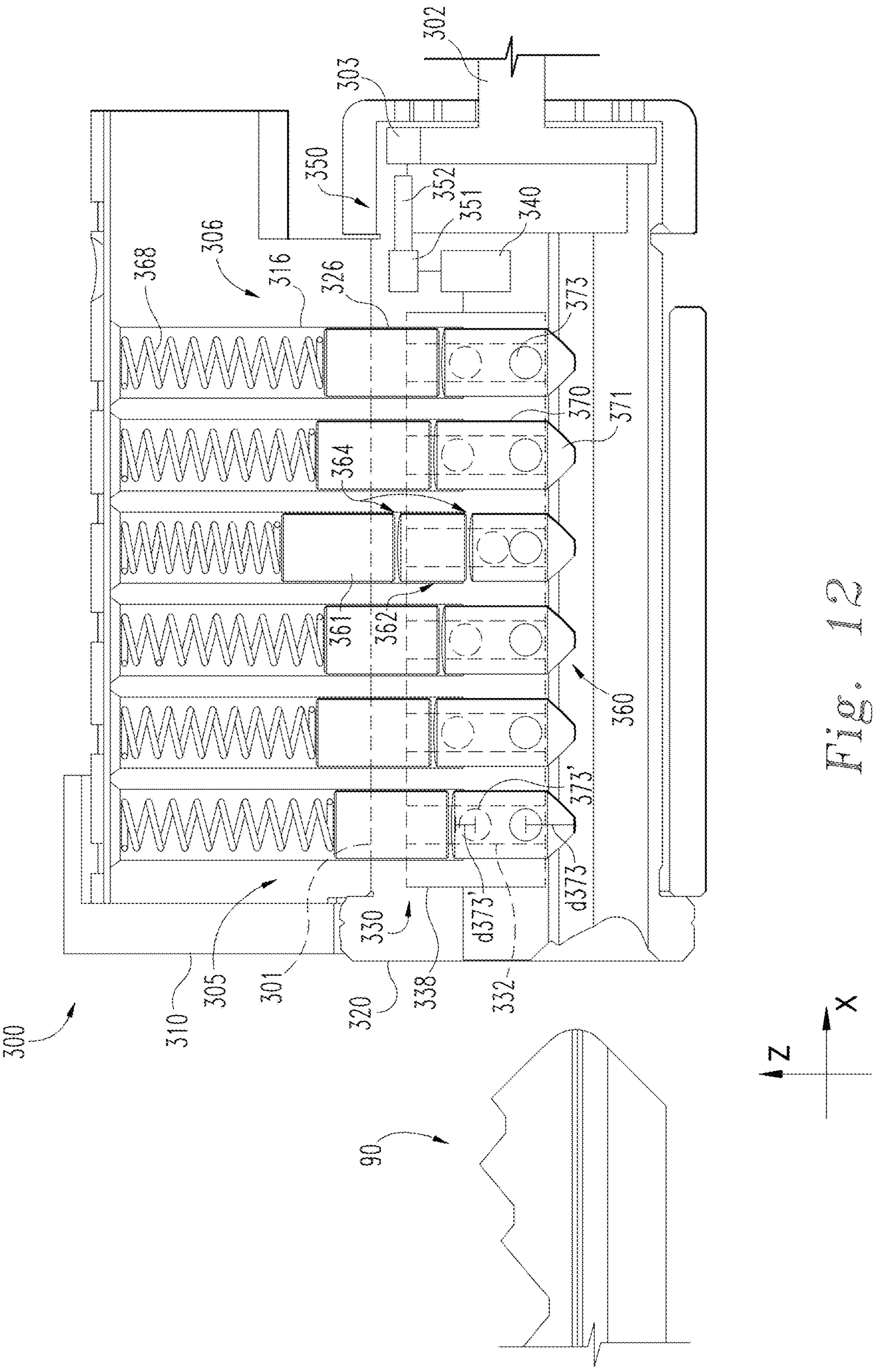
FIG. 12 is a cross-sectional illustration of the lock cylinder illustrated in FIG. 10.

FIGS. 10-12 illustrate a lock cylinder 300 according to another embodiment. The lock cylinder 300 may, for example, be an implementation of the above-described lock cylinder 100. Additionally, lock cylinder 300 includes a plug 320 and key followers 370, which are substantially similar to the plug 220 and key followers 270 described above with reference to the lock cylinder 200. In FIGS. 10-12 and the following description thereof, similar reference characters are used to indicate elements and features which are similar to those described above with reference to the lock cylinders 100, 200. In the interest of conciseness, the following description is focused primarily on features which were not specifically described with reference to the lock cylinder 100 or which differ from the corresponding features described with reference to the lock cylinder 200.

In the illustrated form, the sensor assembly 330 is an optical sensor assembly including a plurality of optical sensors 332, each of which includes at least one optical sensing region 333. Each key follower 370 includes a pair of lateral arms 374 extending laterally from the body portion 372. Each of the arms 374 supports an optical sensor interface in the form of an optical patch 373. Each of the plug tumbler shafts 326 includes a pair of lateral channels 324 which extend laterally from opposite sides of the transverse portion 322. Each arm 374 is received in one of the lateral channels 324 with the optical patch 373 positioned in the interface receiving portion 323. In the illustrated form, the interface receiving portions 323 have the same longitudinal length as the lateral channels 324. It is also contemplated that the interface receiving portions 323 could have a greater or lesser longitudinal length than the lateral channels 324. With the optical patches 373 seated in the interface receiving portions 323, each optical patch 373 faces a corresponding one of the optical sensing regions 333 such that a link can be formed between the key follower 370 and the corresponding optical sensor 332.

Like the lock cylinder 100, the lock cylinder 300 includes a mechanical locking mechanism 305 including a plurality of tumbler sets 360. Each tumbler set 360 includes a top or driving pin 361 and one of the key followers 370, and may further include one or more intermediate pins 362. In contrast to the cup 278 illustrated on the key followers 270, the key followers 370 of the instant embodiment include a beveled upper surface 378 through which the key followers 370 engage the upper and/or intermediate pins 361, 362.

In the illustrated form, the arms 374 are positioned on the body portions 372 such that the optical patches 373 have a constant transverse offset distance d373 with respect to the key engagement surfaces 379. In such embodiments, the optical patches 373 are aligned with one another when no key 90 is inserted (FIG. 12), and become misaligned with one another when the proper key 90. As a result, the output signals of the optical sensors 332 have the same value when no key 90 is inserted, and have varying values when the key 90 is fully inserted.

It is also contemplated that the patches 373 may define a constant transverse offset with respect to the upper surfaces 378 of the key followers. For example FIG. 12 illustrates optical patches 373' which have a constant transverse offset distance d373' with respect to upper surface 378. Further details regarding one such embodiment are provided below with reference to the lock cylinder 500 illustrated in FIG. 16.

The lock cylinder 300 also includes an electronic locking mechanism 350 according to another embodiment. The electronic locking mechanism 350 is in communication with the controller 340, and includes an actuator 351 operable to extend and retract a clutching armature 352. The armature 352 is aligned with a channel 303 formed in the tailpiece 302, and is operable in an extended unlocking position and a retracted locking position. In the extended position, the armature 352 is received in the channel 303, thereby rotationally coupling the plug 320 and the tailpiece 302. Thus, when the mechanical locking mechanism 305 is in an unlocking state, the plug 320 is operable to rotate the tailpiece 302. In the retracted position, the armature 352 is removed from the channel 303, thereby rotationally decoupling the plug 320 and the tailpiece 302. In this state, the plug 320 is not operable to rotate the tailpiece 302 regardless of the state of the mechanical locking mechanism 305.

In certain forms, the process 1000 may be performed using the lock cylinder 300. One such implementation of the process 1000 will now be described. It is to be understood that the following description is intended as an exemplary use case scenario, and is not to be construed as limiting the scope of the subject matter disclosed herein. An attacker applies a torque to the plug 320 and inserts a picking tool into the keyway 321. The attacker uses the picking tool to adjust the transverse position of the first key follower 370*a*, thereby causing a variation in the output signal 180*a* of the first optical sensor 332*a*. The controller 340 interprets the variation in the first output signal 180*a* as the initialization action 1002 in the operation 1001, and the process 1000 continues to the tamper detection operation 1010.

In the operation 1010, the controller 340 monitors the output signals 180 of the optical sensor assembly 332, and compares the output signal set 1080 to the criteria 1012. Due to the fact that the picking attack takes more time than a normal key insertion event, the total time elapsed after activation of the first optical sensor 332*a* exceeds an upper time limit of the normal key insertion event criteria 1012 before each of the key followers 170 can be adjusted to the unlocking position. As a result, the controller 340 determines a tampering event 1017 has occurred, and the conditional 1016 directs the process 1000 to continue to the operation 1040.

In the operation 1040, the controller 340 selects the reporting action 1048 in response to the tampering event 1017. In the operation 1060, the controller 340 performs the reporting action 1048 by issuing a reporting signal 1068 to the gateway 194. In response to the reporting signal 1068, the gateway 198 logs the time and date of the attempted tampering event on the server 194. The gateway 198 also issues an SMS message to the mobile device 195, thereby alerting an authorized user of the attempted attack on the lock cylinder 300.

As a result of the picking, the attacker may be able to place the mechanical locking assembly (i.e. the tumbler sets 360) in an unlocking state. Due to the fact that the unlocking action 1044 was not selected in the operation 1040, however, the armature 352 remains in the retracted locking position. As a result, the attacker remains unable to rotate the tailpiece 302 despite the fact that the mechanical locking assembly has been defeated.

Figure 13:
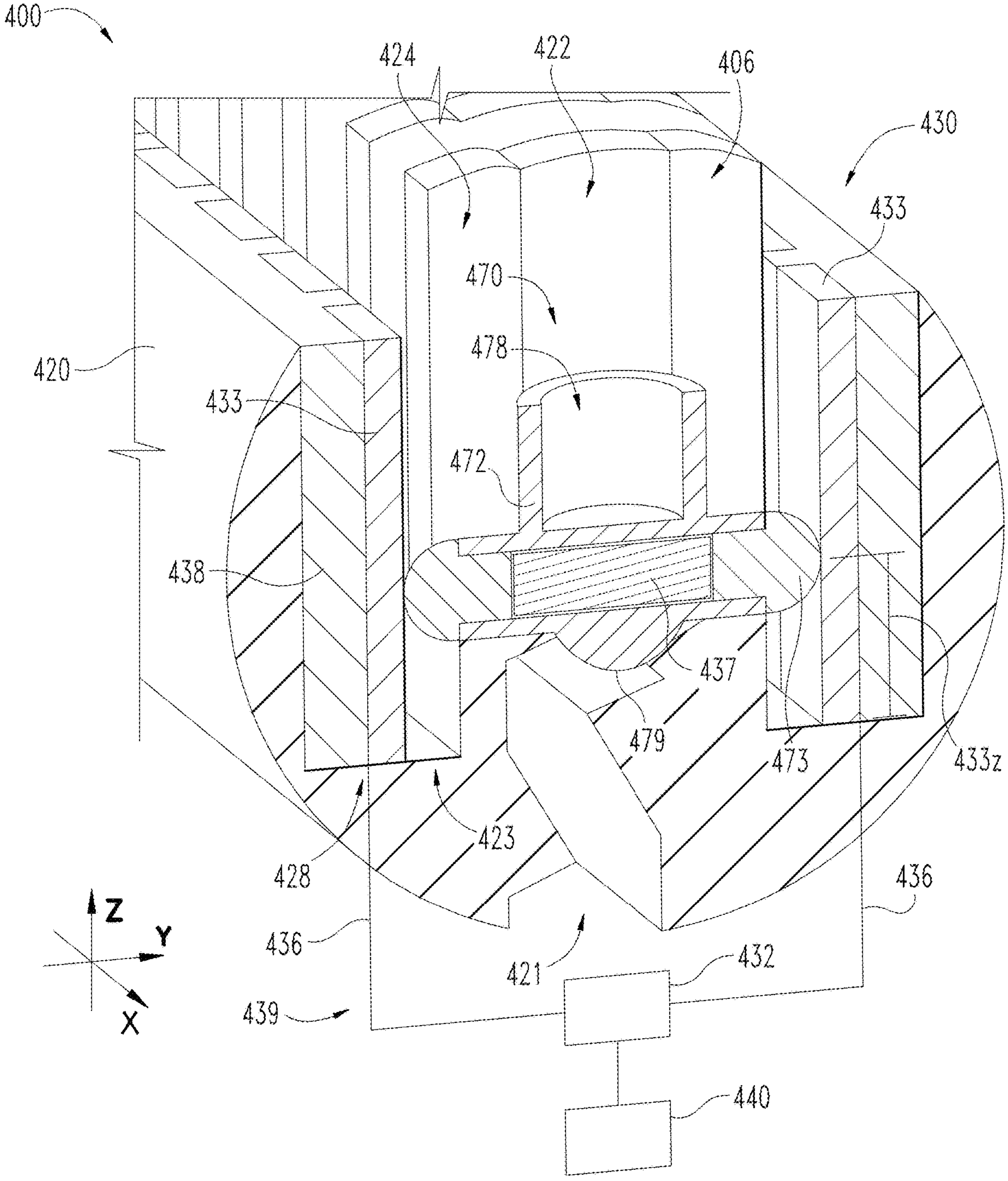
FIG. 13 is a perspective cut-away illustration of a lock cylinder according to another embodiment.
Figure 14:
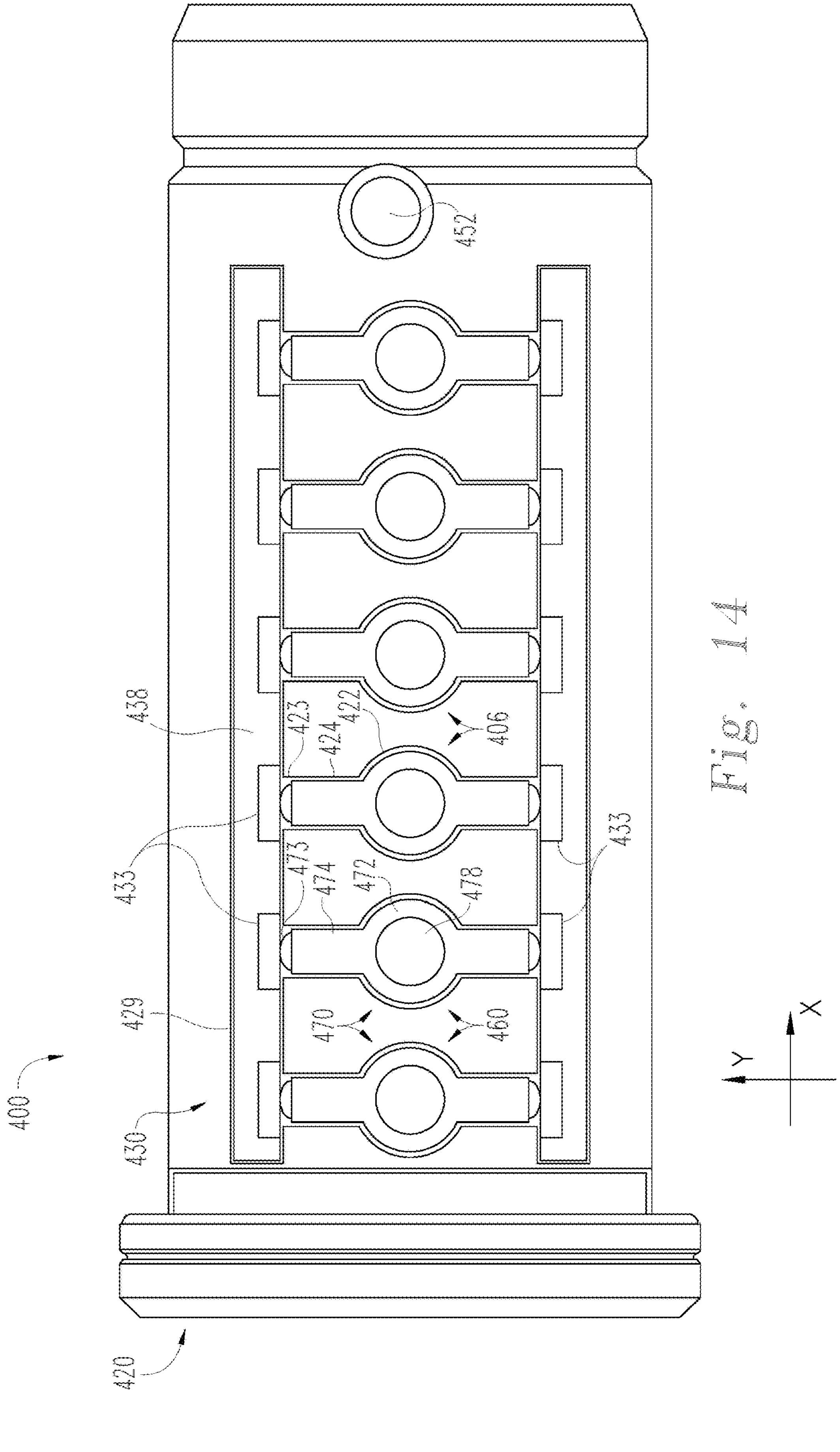
FIG. 14 is a plan view of the lock cylinder illustrated in FIG. 13.
Figure 15:
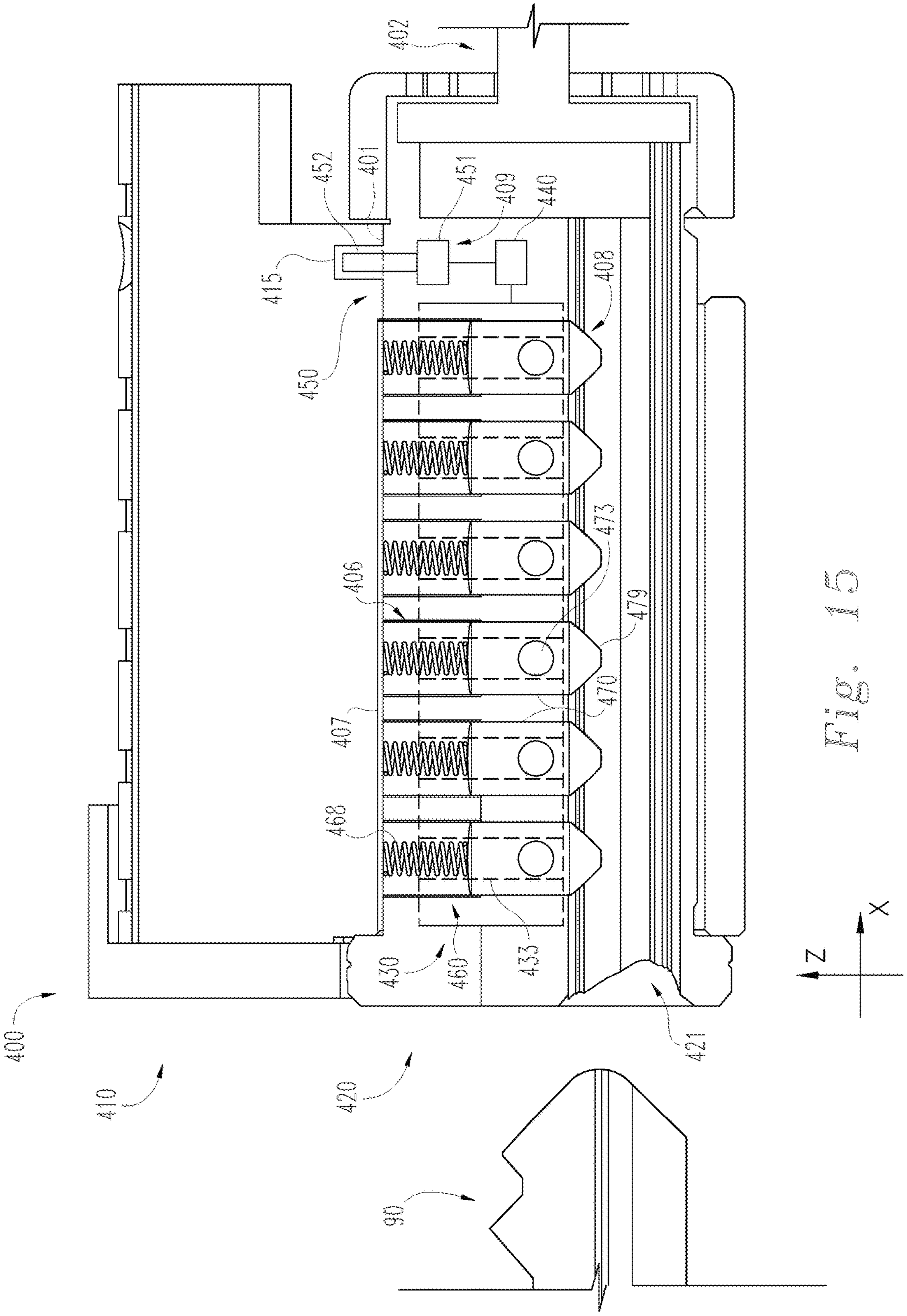
FIG. 15 is a cross-sectional illustration the lock cylinder illustrated in FIG. 13.

FIGS. 13-15 illustrate a lock cylinder 400 according to another embodiment. The lock cylinder 400 may, for example, be an implementation of the above-described lock cylinder 100. Additionally, the plug 420 and key followers 470 are substantially similar to the above described plug 320 and key followers 370. In FIGS. 13-15 and the description thereof, similar reference characters are used to indicate elements and features which are similar to those described above with reference to the cylinders 100, 200, 300. In the interest of conciseness, the following description is focused primarily on features which were not specifically described with reference to the lock cylinder 100 or which differ from the corresponding features described with reference to the lock cylinders 200, 300.

In the illustrated form, the sensor assembly 430 is a resistive sensor assembly including a plurality of sensors 432 and a plurality of circuits 439. Each of the sensors 432 includes or is connected to a corresponding one of the circuits 439, and each circuit 439 includes a pair of sensing regions in the form of resistive pads 433. The pads 433 are positioned on opposite sides of the keyway 421, and leads 436 connect the pads 433 to the corresponding sensor 432. Additionally, each key follower 470 includes a pair of conductive interfaces in the form of wipers 473, each of which is engaged with one of the resistive pads 433. In certain forms, the circuit 439 may further include a conductor 437 which electrically couples the wipers 473 to one another. In other forms, the wipers 473 may be electrically coupled by the arms 474 and the body portion 472. In either event, the circuit 439 is closed about the sensor 432, such that the sensor 432 is operable to sense a resistance of the circuit 439.

As will be appreciated, the resistance of the circuit 439 corresponds to the effective height 433*z* of the resistive pads 433 (i.e. the transverse height of pads 433 within the circuit 439), which in turn corresponds to the transverse position of the key follower 470. In the illustrated embodiment, the leads 436 are connected to the "lower" (Z) end of the resistive pads 433, such that the effective height 4332 and the resistance of the circuit 439 are at a minimum when the key follower 470 is in the home position. As such, movement of the key follower 470 in the "upward" ($Z^+$) direction increases the effective height 4332, thereby causing a corresponding increase in the resistance of the circuit 439. Conversely, if the leads 436 were connected to the "upper" ($Z^+$) ends of the resistive pads 433, the resistance of the circuit 439 would be at a maximum when the key follower 470 is in the home position, and would decrease in response to movement of the key follower 470 in the "upward" ($Z^+$) direction. In either event, the resistance of the circuit 439 correlates to the transverse position of the key follower 470.

In the illustrated form, the sensors 432 are resistance sensors or ohmmeters, which are configured to generate an output signal corresponding to the resistance of the circuit 439. It is also contemplated that the sensors 432 may be current sensors or ammeters, in which case the output signals thereof may be inversely proportional to the resistance of the corresponding circuit 439. In either event, the output signals of the sensors 432 correlate to the transverse positions of the key followers 470 in a known relationship. As such, the resistive sensor assembly 430 is operable to generate an output signal set from which the transverse positions of the key followers 470 can be determined.

The lock cylinder 400 also includes an electronic locking mechanism 450 according to another embodiment. The electronic locking mechanism 450 is in communication with the controller 440, and includes an actuator 451 operable to extend and retract an armature 452. The armature 452 is aligned with an opening 415 formed in the shell 410, and is operable in an extended position and a retracted position. In the extended or locking position, the armature 452 is received in the opening 415, thereby preventing rotation of the plug 420 with respect to the shell 410. As a result, the plug 420 is not operable to rotate the tailpiece 402. In the retracted or unlocking position, the armature 452 is removed from the opening 415, such that the electronic locking mechanism 450 does not prevent rotation of the plug 420 with respect to the shell 410, thereby enabling the plug 420 to rotate the tailpiece 402.

Figure 16:
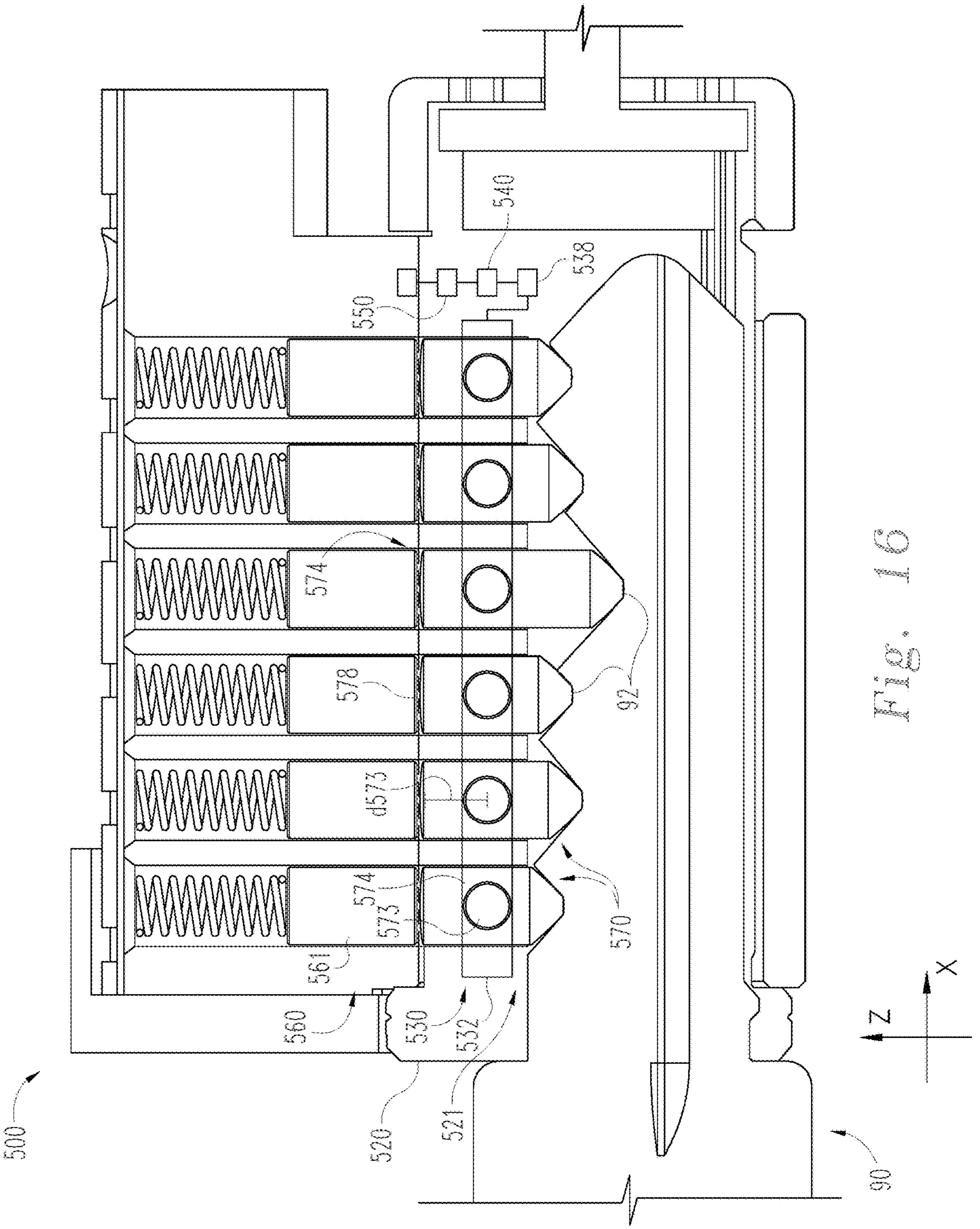
FIG. 16 is a cross-sectional illustration of a lock cylinder according to another embodiment.

FIG. 16 illustrates a lock cylinder 500 according to another embodiment. The lock cylinder 500 is structurally similar to the above-described lock cylinder 300, and similar reference characters are used to denote similar elements and features.

As noted above, the optical patches 373 in the above-described lock cylinder 300 define a constant offset d373 with respect to the "lower" (Z) engagement surfaces 379 of the key followers 370. In the illustrated form, however, the optical patches 573 define a constant offset d573 with respect to the "upper" ($Z^+$) beveled surfaces 578. As a result, the optical patches 573 become aligned when the proper key 90 is inserted, as illustrated in FIG. 16. Additionally, the sensor assembly 530 of the instant embodiment includes a single optical sensor 532 on each side of the keyway 521. The optical sensor 532 is structured to generate an alignment signal when the optical patches 573 are aligned with one another, and may further be structured to generate a misalignment signal when the optical patches 573 are not aligned with one another.

The controller 540 is in communication with the sensor assembly 530, and is configured to select one or more actions based upon the signals received from the sensor assembly 530. For example, the controller 540 may issue an unlock command to the electronic locking mechanism 550 in response to the alignment signal, and/or may issue a reporting signal in response to the misalignment signal.

It is to be understood that the above-described combinations of locking assemblies and key recognition assemblies are intended to be illustrative only, and that each of the locking assemblies may be utilized with each of the key recognition assemblies. By way of example, while the capacitive key recognition assembly 209 is illustrated in combination with the sidebar locking assembly 208, it is also contemplated that the capacitive key recognition assembly 209 may be utilized in combination with the clutching assembly 309, the plug-locking assembly 409, and/or a mechanical locking assembly such as the tumbler set 160. For example, when the capacitive key recognition assembly 209 is utilized in combination with the tumbler set 160, the shell 210 may include shell tumbler shafts, and the bottom pin 170 may be provided in the form of the capacitive key follower 270. In such forms, the key followers 270 need not include the cups 278, and the springs 268 may be positioned in the shell tumbler shafts.

As noted above, the locking assembly 108 need not include the mechanical locking mechanism 105, and the locked/unlocked state of the cylinder 100 may be defined entirely by the locking/unlocking state of the electronic locking mechanism 150. Further details regarding such embodiments will now be described with reference to the lock cylinder 200. However, it is to be appreciated that this description may be equally applicable to other forms of lock cylinder 100 in which the locking assembly 108 does not include a mechanical locking mechanism 105.

In the lock cylinder 200, the locked/unlocked state is defined entirely by the locking/unlocking state of the electronic locking mechanism 250. In other words, the locked/unlocked state of the cylinder 200 is not dependent upon the alignment of break points with the shear line 201, as may be the case if the cylinder 200 were to include a mechanical locking mechanism. As a result, the cylinder 200 may be operable by each of a plurality of keys having different edge cuts 94. For example, the cylinder 200 may be utilized in a facility in which one or more conventional lock cylinders were also utilized, wherein each of the conventional lock cylinders has an associated bitting profile 94. In such forms, information related to the bitting profiles 94 associated with the conventional lock cylinders may be stored in memory as reference key profiles 1052. As a result, the cylinder 200 would be operable by the same keys as the conventional lock cylinders, thereby reducing the number of keys that an authorized user would need to carry.

Certain manufacturers of key and lock mechanisms utilize one or more standard cross-sections for their keys and keyways. Occasionally, a keyway having a cross-section which is standard to one manufacturer may be inoperable to accept a key having a cross-section which is standard to another manufacturer. However, due to the fact that the lock cylinder 200 reads the key cut 94 electronically, the keyway 221 may be structured to accept keys having varying cross-sections, such that the lock cylinder 200 is usable with keys provided by different manufacturers. Thus, when the lock cylinder 200 is utilized in combination with one or more other lock cylinders in the manner described above, the lock cylinder 200 may be operable by the same keys as the other lock cylinders despite the fact that the cylinders may be provided by a different manufacturer. As a result, the lock cylinder 200 may be readily implemented in a facility which also includes other forms of lock cylinders without requiring additional keys and/or the replacement of the existing lock cylinders.

Furthermore, the electronic key recognition assembly 209 facilitates master-keying of the lock cylinder 200, for example when a plurality of the lock cylinders 200 are be installed in a single facility. In such forms, the authorization data 1050 for each of the lock cylinders 200 may include a common master reference key profile 1052, such that each of the lock cylinders 200 is operable by a key having the master key reference profile 1052. Each of the lock cylinders 200 may also include a unique operating key profile 1052, such that each lock cylinder 200 is operable by the corresponding operating key profile 1052, but is not necessarily operable by the operating key profiles 1052 corresponding to the other cylinders 200. As a result, the lock cylinder 200 may be readily reprogrammed to accept different master keys and/or operating keys by altering the authorization data 1050. The authorization data 1050 may, for example, be altered as a result of the rekeying action 1048.

Figure 17:
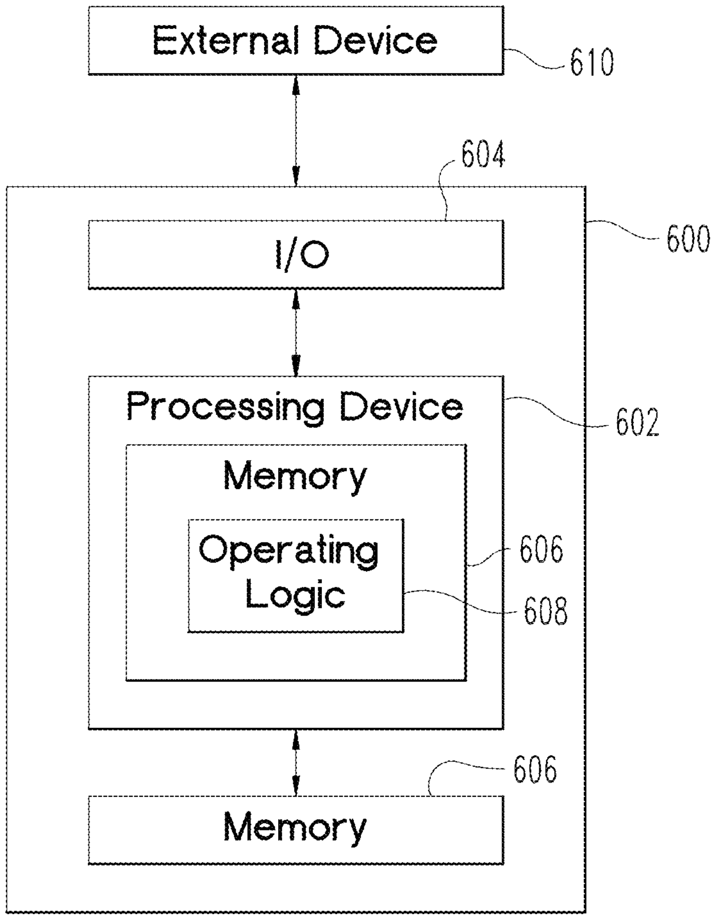
FIG. 17 is a schematic block diagram of a computing device which may be utilized in connection with certain embodiments.

FIG. 17 is a schematic block diagram of a computing device 600. The computing device 600 is one example of a computer, server, mobile device, reader device, or equipment configuration which may be utilized in connection with the controller 140, server 194, mobile device 195, or gateway 198 illustrated in FIG. 2. The computing device 600 includes a processing device 602, an input/output device 604, memory 606, and operating logic 608. Furthermore, the computing device 600 communicates with one or more external devices 610.

The input/output device 604 allows the computing device 600 to communicate with the external device 610. For example, the input/output device 604 may be a network adapter, network card, interface, or a port (e.g., a USB port, serial port, parallel port, an analog port, a digital port, VGA, DVI, HDMI, FireWire, CAT 5, or any other type of port or interface). The input/output device 604 may be comprised of hardware, software, and/or firmware. It is contemplated that the input/output device 604 includes more than one of these adapters, cards, or ports.

The external device 610 may be any type of device that allows data to be inputted or outputted from the computing device 600. For example, the external device 610 may be a mobile device, a reader device, equipment, a handheld computer, a diagnostic tool, a controller, a computer, a server, a printer, a display, an alarm, an illuminated indicator such as a status indicator, a keyboard, a mouse, or a touch screen display. Furthermore, it is contemplated that the external device 610 may be integrated into the computing device 600. It is further contemplated that there may be more than one external device in communication with the computing device 600.

The processing device 602 can be of a programmable type, a dedicated, hardwired state machine, or a combination of these; and can further include multiple processors, Arithmetic-Logic Units (ALUs), Central Processing Units (CPUs), Digital Signal Processors (DSPs) or the like. For forms of processing device 602 with multiple processing units, distributed, pipelined, and/or parallel processing can be utilized as appropriate. The processing device 602 may be dedicated to performance of just the operations described herein or may be utilized in one or more additional applications. In the depicted form, the processing device 602 is of a programmable variety that executes algorithms and processes data in accordance with operating logic 608 as defined by programming instructions (such as software or firmware) stored in memory 606. Alternatively or additionally, the operating logic 608 for processing device 602 is at least partially defined by hardwired logic or other hardware. The processing device 602 can be comprised of one or more components of any type suitable to process the signals received from input/output device 604 or elsewhere, and provide desired output signals. Such components may include digital circuitry, analog circuitry, or a combination of both.

The memory 606 may be of one or more types, such as a solid-state variety, electromagnetic variety, optical variety, or a combination of these forms. Furthermore, the memory 606 can be volatile, nonvolatile, or a combination of these types, and some or all of memory 606 can be of a portable variety, such as a disk, tape, memory stick, cartridge, or the like. In addition, the memory 606 can store data that is manipulated by the operating logic 608 of the processing device 602, such as data representative of signals received from and/or sent to the input/output device 604 in addition to or in lieu of storing programming instructions defining the operating logic 608, just to name one example. As shown in FIG. 17, the memory 606 may be included with the processing device 602 and/or coupled to the processing device 602.

The processes in the present application may be implemented in the operating logic 608 as operations by software, hardware, artificial intelligence, fuzzy logic, or any combination thereof, or at least partially performed by a user or operator. In certain embodiments, units represent software elements as a computer program encoded on a non-transitory computer readable medium, wherein the controller 140, server 194, mobile device 195, or gateway 198 performs the described operations when executing the computer program.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A lock cylinder, comprising:

a plug comprising a longitudinally-extending keyway, a longitudinal channel positioned adjacent the keyway, and a plurality of tumbler shafts that communicate with the keyway and the longitudinal channel;

a plurality of key followers each received in a corresponding one of the tumbler shafts and configured to move along the corresponding one of the tumbler shafts when engaged by a key inserted into the keyway; and a sensor assembly, comprising:

a printed circuit board seated in the longitudinal channel; and a first plurality of sensors mounted to the printed circuit board, each of the first plurality of sensors is associated with a corresponding one of the key followers and is configured to generate a first output signal correlated to a position of the corresponding one of the key followers.

2. The lock cylinder of claim 1, wherein the longitudinal channel of the plug extends parallel to the keyway.

3. The lock cylinder of claim 1, wherein the plug further comprises a second longitudinal channel positioned adjacent the keyway, and a second plurality of tumbler shafts that communicate with the keyway and the second longitudinal channel; and wherein the sensor assembly further comprises a second printed circuit board seated in the second longitudinal channel; and a second plurality of sensors each mounted to the second printed circuit board, each of the second plurality of sensors is associated with a corresponding one of a second plurality of key followers and is configured to generate a second output signal correlated to a position of the corresponding one of the second plurality of key followers.

4. The lock cylinder of claim 3, wherein the sensor assembly is configured to generate an output signal set based on the first output signals of the first plurality of sensors and the second output signals of the second plurality of sensors.

5. The lock cylinder of claim 4, further comprising a controller in communication with the sensor assembly and configured to generate a key profile based on the output signal set; and wherein the controller is further configured to:

select an action based on a comparison of the key profile to a reference key profile; and perform the selected action.

6. The lock cylinder of claim 3, wherein the longitudinal channel is positioned on a first side of the keyway;

wherein the second longitudinal channel is positioned on a second side of the keyway opposite the first side; and wherein the longitudinal channel and the second longitudinal channel each extend parallel to the keyway.

7. The lock cylinder of claim 1, wherein each of the key followers includes a plate portion positioned adjacent the longitudinal channel.

8. The lock cylinder of claim 1, wherein each of the plurality of sensors is a capacitive sensor.

9. The lock cylinder of claim 1, further comprising:

a tailpiece extending from a distal end of the plug; and a lock assembly structured to selectively prevent the plug from rotating the tailpiece.

10. The lock cylinder of claim 9, wherein the lock assembly comprises an electronic lock having a locking state in which the electronic lock prevents the plug from rotating the tailpiece, and an unlocking state in which the electronic lock does not prevent the plug from rotating the tailpiece.

11. A lock cylinder, comprising:

a plug comprising a longitudinally-extending keyway, a longitudinal channel positioned adjacent the keyway, and a plurality of tumbler shafts that communicate with the keyway and the longitudinal channel;

a plurality of key followers each received in a corresponding one of the tumbler shafts and configured to move along the corresponding one of the tumbler shafts when engaged by a key inserted into the keyway;

a sensor assembly, comprising:

a printed circuit board seated in the longitudinal channel; and a first plurality of sensors mounted to the printed circuit board, each of the first plurality of sensors is associated with a corresponding one of the key followers and is configured to generate a first output signal correlated to a position of the corresponding one of the key followers; and wherein the sensor assembly is configured to generate an output signal set including the output signal of each of the first plurality of sensors; and a controller in communication with the sensor assembly and configured to generate a key profile based on the output signal set.

12. The lock cylinder of claim 11, wherein the controller is further configured to:

select an action based on a comparison of the generated key profile to a reference key profile; and perform the selected action.

13. The lock cylinder of claim 11, further comprising:

a tailpiece extending from a distal end of the plug; and a lock assembly structured to selectively prevent the plug from rotating the tailpiece; and wherein the lock assembly comprises an electronic lock having a locking state in which the electronic lock prevents the plug from rotating the tailpiece, and an unlocking state in which the electronic lock does not prevent the plug from rotating the tailpiece.

14. The lock cylinder of claim 13, wherein the controller is configured to perform an unlocking action based at least in part on a match between the generated key profile and an authorized key profile.

15. The lock cylinder of claim 14, wherein performing the unlocking action includes issuance of an unlocking command to the electronic lock; and wherein the electronic lock is configured to transition from the locking state to the unlocking state in response to the unlocking command.

16. A lock cylinder, comprising:

a plug comprising a longitudinally-extending keyway, a first longitudinal channel, a second longitudinal channel, a first plurality of tumbler shafts that communicate with the keyway and the first longitudinal channel, and a second plurality of tumbler shafts that communicate with the keyway and the second longitudinal channel;

a first plurality of key followers each received in a corresponding one of the first tumbler shafts and configured to move along the corresponding one of the first tumbler shafts when engaged by a key inserted into the keyway;

a first plurality of key followers each received in a corresponding one of the second tumbler shafts and configured to move along the corresponding one of the second tumbler shafts when engaged by the key inserted into the keyway; and a sensor assembly, comprising:

a first printed circuit board seated in the first longitudinal channel;

a second printed circuit board seated in the second longitudinal channel;

a first plurality of sensors mounted to the first printed circuit board, each of the first plurality of sensors associated with a corresponding one of the first plurality of key followers and each configured to generate a first output signal correlated to a position of the corresponding one of the first plurality of key followers; and a second plurality of sensors mounted to the second printed circuit board, each of the second plurality of sensors associated with a corresponding one of the second plurality of key followers and each configured to generate a second output signal correlated to a position of the corresponding one of the second plurality of key followers.

17. The lock cylinder of claim 16, wherein the sensor assembly is configured to generate an output signal set based on:

the first output signal of each of the first plurality of sensors; and the second output signal of each of the second plurality of sensors.

18. The lock cylinder of claim 17, further comprising a controller in communication with the sensor assembly and configured to generate a key profile based on the output signal set; and wherein the controller is further configured to:

select an action based on a comparison of the generated key profile to a reference key profile; and perform the selected action.

19. The lock cylinder of claim 18, further comprising:

a tailpiece extending from a distal end of the plug; and a lock assembly structured to selectively prevent the plug from rotating the tailpiece; and wherein the lock assembly comprises an electronic lock having a locking state in which the electronic lock prevents the plug from rotating the tailpiece, and an unlocking state in which the electronic lock does not prevent the plug from rotating the tailpiece.

20. The lock cylinder of claim 19, wherein the controller is configured to perform an unlocking action based at least in part on a match between the generated key profile and an authorized key profile;

wherein performing the unlocking action includes issuance of an unlocking command to the electronic lock; and wherein the electronic lock is configured to transition from the locking state to the unlocking state in response to the unlocking command.

* * * * *